US010789352B2

(12) United States Patent
Yaqub et al.

(10) Patent No.: US 10,789,352 B2
(45) Date of Patent: Sep. 29, 2020

(54) MULTIDEVICE USER AUTHENTICATION IN GROUP-BASED COMMUNICATION SYSTEMS

(71) Applicant: Slack Technologies, Inc., San Francisco, CA (US)

(72) Inventors: Faisal Yaqub, San Francisco, CA (US); Chase Rutherford-Jenkins, San Francisco, CA (US); Graham Hicks, San Francisco, CA (US)

(73) Assignee: Slack Technologies, Inc., San Francisco, CA (US)

( * ) Notice: Subject to any disclaimer, the term of this patent is extended or adjusted under 35 U.S.C. 154(b) by 175 days.

(21) Appl. No.: 16/165,738

(22) Filed: Oct. 19, 2018

(65) Prior Publication Data

US 2020/0125715 A1 Apr. 23, 2020

(51) Int. Cl.
*G06F 21/36* (2013.01)
*H04L 29/06* (2006.01)
(Continued)

(52) U.S. Cl.
CPC .......... *G06F 21/36* (2013.01); *G06F 21/43* (2013.01); *H04L 9/3213* (2013.01); *H04L 63/0846* (2013.01)

(58) Field of Classification Search
CPC ..... G06F 21/36; G06F 21/43; H04L 63/0846; H04L 9/3213; H04L 63/104; H04L 9/3297
See application file for complete search history.

(56) References Cited

U.S. PATENT DOCUMENTS 10,277,569 B1 * 4/2019 Barbour .............. H04L 63/061
2006/0236384 A1 * 10/2006 Lindholm ........... H04L 9/3226
726/10

(Continued)

OTHER PUBLICATIONS

The Big Pivot w/ Slack's Stewart Butterfield, Masters of Scale Podcast, Episode 13 (Aired Nov. 14, 2017), https://mastersofscale.com/#/stewart-butterfield-the-big-pivot/, (dated Jan. 17, 2018) 27 pages.

(Continued)

*Primary Examiner* — J. Brant Murphy
(74) *Attorney, Agent, or Firm* — Morrison & Foerster LLP

(57) ABSTRACT

Method, apparatus and computer program product for multi-device user authentication are described herein. For example, the apparatus includes at least one processor and at least one non-transitory memory including program code. The at least one non-transitory memory and the program code are configured to, with the at least one processor, identify, on a first computing device, a first active interface session associated with one or more active authentication conditions each configured to enable access to a group-based communication interface of a group-based communication system; cause a first computing device to present an authentication command interface for the first active interface session; receive an interface session request from a second computing device indicating electronic communication by the second computing device with the authentication command interface; and cause the second computing device to execute limited user authentication routines each configured to enable a respective active authentication condition on the second computing device.

24 Claims, 16 Drawing Sheets

(51) Int. Cl.
*H04L 9/32* (2006.01)
*G06F 21/43* (2013.01)

(56) References Cited

U.S. PATENT DOCUMENTS

| | | | |
|---|---|---|---|
| 2009/0006850 A1* | 1/2009 | Birger | H04L 29/12207 713/169 |
| 2009/0007234 A1* | 1/2009 | Birger | H04L 61/20 726/3 |
| 2014/0075513 A1* | 3/2014 | Trammel | H04L 63/0876 726/4 |
| 2014/0173695 A1* | 6/2014 | Valdivia | G06F 21/33 726/4 |
| 2015/0180868 A1* | 6/2015 | Sng | G06F 12/121 726/9 |
| 2017/0019256 A1* | 1/2017 | Rhelimi | H04L 9/0833 |
| 2017/0078283 A1* | 3/2017 | Unagami | H04L 9/0833 |
| 2018/0006818 A1* | 1/2018 | Ren | H04L 9/3213 |
| 2018/0191700 A1* | 7/2018 | Kong | H04L 41/046 |
| 2018/0287982 A1* | 10/2018 | Draeger | H04L 51/16 |

OTHER PUBLICATIONS

Robert Hof, "Stewart Butterfield on How Slack Became a $2.8 Billion Unicorn", Forbes, [online][retrieved May 9, 2019]. Retrieved from the Internet: <URL: https://www.forbes.com/sites/roberthof/2015/06/02/stewart-butterfield-on-how-slack-became-a-2-8-billion-unicorn-2/#7c31937d7d9c>. (dated Jun. 2, 2015, 3;25 PM), 3 pages.

Rebecca Walberg, "Email biggest office waste of time: survey", National Post, At FP10, Lexisnexis, https://advance.lexis.com/api/permalink/96268e3f-26ad-48ac-a98f-6c39804ebded/?context=1000516, (dated Mar. 4, 2014) 2 pages.

Oikarinen, J. & Reed, D., "Internet Relay Chat Protocol", Request for Comments: 1459, Network Working Group, [online][retrieved May 30, 2019]. Retrieved from the Internet: <URL: https://www.rfc-editor.org/rfc/rfc1459.txt>. (dated May 1993) 66 pages.

Mike Issac, "Slack, a Start-Up With an App to Foster Business Collaboration, Is Valued at $1.1 Billion", The New York Times Blogs (Bits), Lexisnexis, https://advance.lexis.com/api/permalink/3eb84b34-a8f9-4d7d-9573-89d9598a4963/?context=1000516>. (dated Oct. 31, 2014) 2 pages.

Michael Carney, "Slack is thriving on a cocktail of whimsy and great timing", Pandodaily, Lexisnexis, https://advance.lexis.com/api/permalink/dd2d4ee5-2ddf-4d3a-a1d9-3bcee5e38b74/?context=1000516, (dated Feb. 6, 2015, 2:12 AM) 3 pages.

Matthew Ingram, "Flickr co-founder launches Slack, an all-in-one messaging tool designed to kill email forever", Gigaom, Lexisnexis, https://advance.lexis.com/api/permalink/0b676b7c-aec3-4560-861e-d030d1dd008c/?context=1000516, (dated Feb. 12, 2014, 7:03 PM), 2 pages.

Jonathan Vanian, "Why these startups think chat apps are the next big thing in workplace collaboration", Gigaom, Lexisnexis, https://advance.lexis.com/api/permalink/e83778c8-09c8-43aa-9ba0-88526283de69/?context=1000516, (dated Aug. 1, 2014, 5:45 PM) 4 pages.

Internet Relay Chat, Wikipedia, , [online][retrieved May 30, 2019]. Retrieved from the Internet: <URL: https://en.wikipedia.org/wiki/Internet_Relay_Chat>. (dated May 28, 2019) 17 pages.

Ernie Smith, "Picking Up the Slack", Tedium, [online][retrieved May 9, 2019]. Retrieved from the Internet: <URL: https://tedium.co/2017/10/17/irc-vs-slack-chat-history/>. (dated Oct. 17, 2017) 8 pages.

David Auerbach, "Re-Animator. How Stewart Butterfield created Flickr and Slack out of the ashes of failed projects" [online][retrieved May 9, 2019]. Retrieved from the Internet: <URL: https://slate.com/business/2014/05/stewart-butterfield-flickr-and-slack-how-he-snatched-victory-from-the-jaws-of-defeat.html>. (dated May 28, 2014, 2:48 PM) 8 pages.

Adrienne LaFrance, "The Triumph of Email", Atlantic Online, Lexisnexis, https://advance.lexis.com/api/permalink/32d7ddd9-d4c1-4a73-86f7-08ab5842fde6/?context=1000516, (dated Jan. 6, 2016) 5 pages.

"How Slack changed the way we work by putting the customer experience first", Repeat Customer Podcast, Episode 3, [online][retrieved May 9, 2019]. Retrieved from the Internet: <URL: https://www.zendesk.com/resources/slack-customer-experience/, (2019) 13 pages.

"Die, Email, Diet a Flickr Cofounder Aims to Cut Us All Some Slack", Readwriteweb, Lexisnexis, https://advance.lexis.com/api/permalink/33dd79e2-90f5-409d-ae27-5a2c7e86bf31/?context=1000516>. (dated Aug. 14, 2013, 4:15 PM) 2 pages.

Matsumoto, T. et al., "Chocoa Communicator—A New Communication System Based on Awareness and Text Communications—", Fujitsu Sci. Tech. J., 36, 2, (Dec. 2000) 154-161.

* cited by examiner

US 10,789,352 B2

MULTIDEVICE USER AUTHENTICATION IN GROUP-BASED COMMUNICATION SYSTEMS

BACKGROUND

Applicant has identified many deficiencies and problems associated with existing methods, apparatus, and systems related to user authentication in group-based communication systems. Through applied effort, ingenuity, and innovation, many of these identified deficiencies and problems have been solved by developing solutions that are in accordance with embodiments of the present disclosure, many examples of which are described in detail herein.

BRIEF SUMMARY

In general, embodiments of the present invention provide methods, apparatus, systems, computing devices, and/or the like for multi-device user authentication in group-based communication systems by using authentication command interfaces and/or limited user authentication routines.

In accordance with one aspect, an apparatus is provided. The apparatus comprises at least one processor and at least one non-transitory memory comprising program code. The at least one non-transitory memory and the program code are configured to, with the at least one processor, cause the apparatus to at least identify, on a first computing device, a first active interface session associated with one or more active authentication conditions, wherein each active authentication condition enables access to a respective group-based communication interface of the group-based communication system; cause a first computing device to present an authentication command interface for the first active interface session, wherein: (i) the authentication command interface is associated with an expiration time, (ii) the authentication command interface is associated with an aggregate authentication token; and (iii) the aggregate authentication token is generated using the expiration time; receive an interface session request from a second computing device indicating electronic communication by the second computing device with the authentication command interface and receipt by the second computing device of the aggregate authentication token at a first time; determine if a relationship between the first time and the expiration time satisfies a temporal condition; and in response to determining that the relationship between the first time and the expiration time satisfies the temporal condition, cause the second computing device to execute one or more limited user authentication routines, wherein each limited user authentication routine is configured to enable a respective active authentication condition on the second computing device.

In one embodiment, the authentication command interface is a visual representation of an authentication command. In one embodiment, the visual representation is a quick response (QR) code. In one embodiment, the authentication command includes a link to an authentication resource.

In one embodiment, causing the second computing device to execute a respective limited user authentication routine of the one or more limited user authentication routines comprises: generating, for the respective group-based communication interface associated with a respective active authentication condition configured to be enabled by the respective limited user authentication routine, a respective group of one or more individual authentication tokens collectively configured to enable access to the respective group-based communication interface; and generating, using the respective group of one or more individual authentication tokens, a second active interface session associated with the respective group-based communication interface, wherein the second active interface session enables access to the respective group-based communication interface. In one embodiment, the respective group of one or more individual authentication tokens includes a password token. In one embodiment, the respective group of one or more individual authentication tokens includes a secondary authentication code token.

In one embodiment, the at least one non-transitory memory and the program code are configured to, with the at least one processor, cause the apparatus to at least generate a session identifier associated with the second active interface session; and provide the session identifier to the second computing device. In one embodiment, the at least one non-transitory memory and the program code are configured to, with the at least one processor, cause the apparatus to at least generate a session identifier associated with the second active interface session; and provide the session identifier to the second computing device. In one embodiment, the at least one non-transitory memory and the program code are configured to, with the at least one processor, cause the apparatus to at least determine if the second computing device is in possession of the session identifier; and in response to determining that the second computing device is not in possession of the session identifier, terminate the second active interface session by disabling access to the respective group-based communication interface on the second computing device.

In one embodiment, causing the first computing device to present the authentication command interface for the first active interface session comprises: generating the aggregate authentication token; generating, using the aggregate authentication token, an authentication command; and generating, using the authentication command, the authentication command interface. In one embodiment, generating the aggregate authentication token comprises: identifying one or more token input values, wherein the one or more token input values include the expiration time; and generating the aggregate authentication token using the one or more token input values. In one embodiment, the one or more token input values further include a randomly-generated value. In one embodiment, the one or more token input values include a respective value denoting a respective identifier associated with each group-based communication interface associated with a respective active authentication condition of the one or more active conditions. In one embodiment, generating the authentication token using the one or more token input values comprises: generating a hashed value using the one or more token input values; and generating the authentication token using the hashed value.

In one embodiment, determining if the relationship between the first time and the expiration time satisfies the temporal condition comprises: determining if the first time precedes the expiration time; in response to determining that the first time precedes the expiration time, determining that the relationship between the first time and the expiration time satisfies the temporal condition; and in response to determining that the first time does not precede the expiration time, determining that the relationship between the first time and the expiration time fails to satisfy the temporal condition.

In one embodiment, the interface session request identifies the aggregate authentication token and the method further comprises extracting the aggregate authentication token from the interface session request.

In one embodiment, the at least one non-transitory memory and the program code are configured to, with the at least one processor, cause the apparatus to at least transmit a respective communication message to each communication account of one or more communication accounts, wherein: (i) each communication account of the one or more communication accounts is associated with a group of one or more active authentication conditions from the one or more active authentication conditions, and (ii) each respective communication message to a respective communication account identifies each group-based communication interface associated with a respective active authentication condition in the respective group of one or more active authentication conditions.

In one embodiment, transmitting a respective communication message to a respective communication account of the one or more communication accounts comprises: identifying, from data associating each communication account of the one or more communication accounts with a group of one or more active authentication conditions from the one or more active authentication conditions, the respective group of one or more active authentication conditions associated with the respective communication account; identifying, from data associating each active authentication condition with a respective group-based communication interface, a respective group of one or more group-based communication interfaces associated with the respective communication account and associated with the aggregate authentication token; generating the respective communication message to include an indication of each respective group-based communication interface in the respective group of one or more group-based communication interfaces; and transmitting the respective communication message to the respective communication account.

In one embodiment, the respective communication message further includes a respective revocation element, wherein the revocation element is configured to cause transmission of a request to revoke access to each group-based communication interface in the respective group of one or more group-based communication interfaces. In one embodiment, the at least one non-transitory memory and the program code are configured to, with the at least one processor, cause the apparatus to at least maintain mapping data, wherein the mapping data includes data associating the respective revocation element with each group-based communication interface in the respective group of one or more group-based communication interfaces.

In one embodiment, the at least one non-transitory memory and the program code are configured to, with the at least one processor, cause the apparatus to at least receive a session revocation request, the session revocation request indicating an electronic communication with revocation element; identify, based on the mapping data and the session revocation request, the respective group of one or more active authentication conditions; and revoke each active authentication condition in the respective group of one or more active authentication conditions on the second computing device by disabling access by the second computing device to each group-based communication interface in the respective group of one or more group-based communication interfaces.

In one embodiment, a first active authentication condition of the one or more active authentication conditions is associated with a first group of one or more privileges for enabling access by the first computing device to a first group-based communication interface; the first active authentication condition is associated with a second group of one or more privileges for enabling access by the second computing device to the first group-based communication interface; and the first group of one or more privileges includes at least one selected privilege not included in the second group of privileges. In one embodiment, the at least one selected privilege includes a privilege to access a selected group-based communication channel of one or more group-based communication channels in the first group-based communication interface. In one embodiment, the at least one selected privilege includes a privilege to add a new communication account to one or more communication accounts associated with the first group-based communication interface.

The above summary is provided merely for purposes of summarizing some example embodiments to provide a basic understanding of some aspects of the invention. Accordingly, it will be appreciated that the above-described embodiments are merely examples and should not be construed to narrow the scope or spirit of the invention. It will be appreciated that the scope of the invention encompasses many potential embodiments in addition to those here summarized, some of which will be further described below.

BRIEF DESCRIPTION OF THE DRAWINGS

Figure 1:
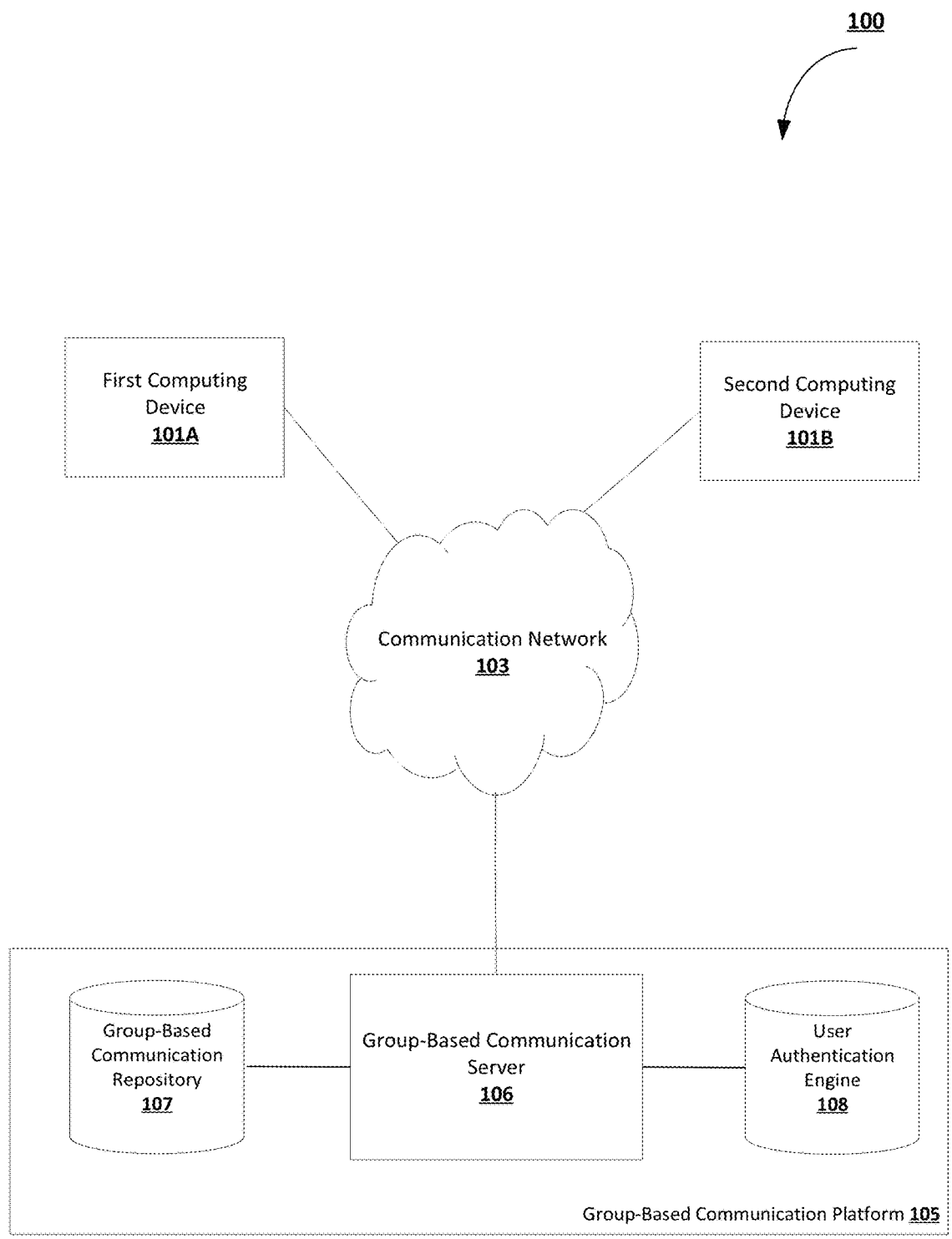

Having thus described some embodiments in general terms, references will now be made to the accompanying drawings, which are not necessarily drawn to scale, and wherein:

FIG. 1 is an example system architecture within which embodiments of the present invention may operate.

Figure 2:
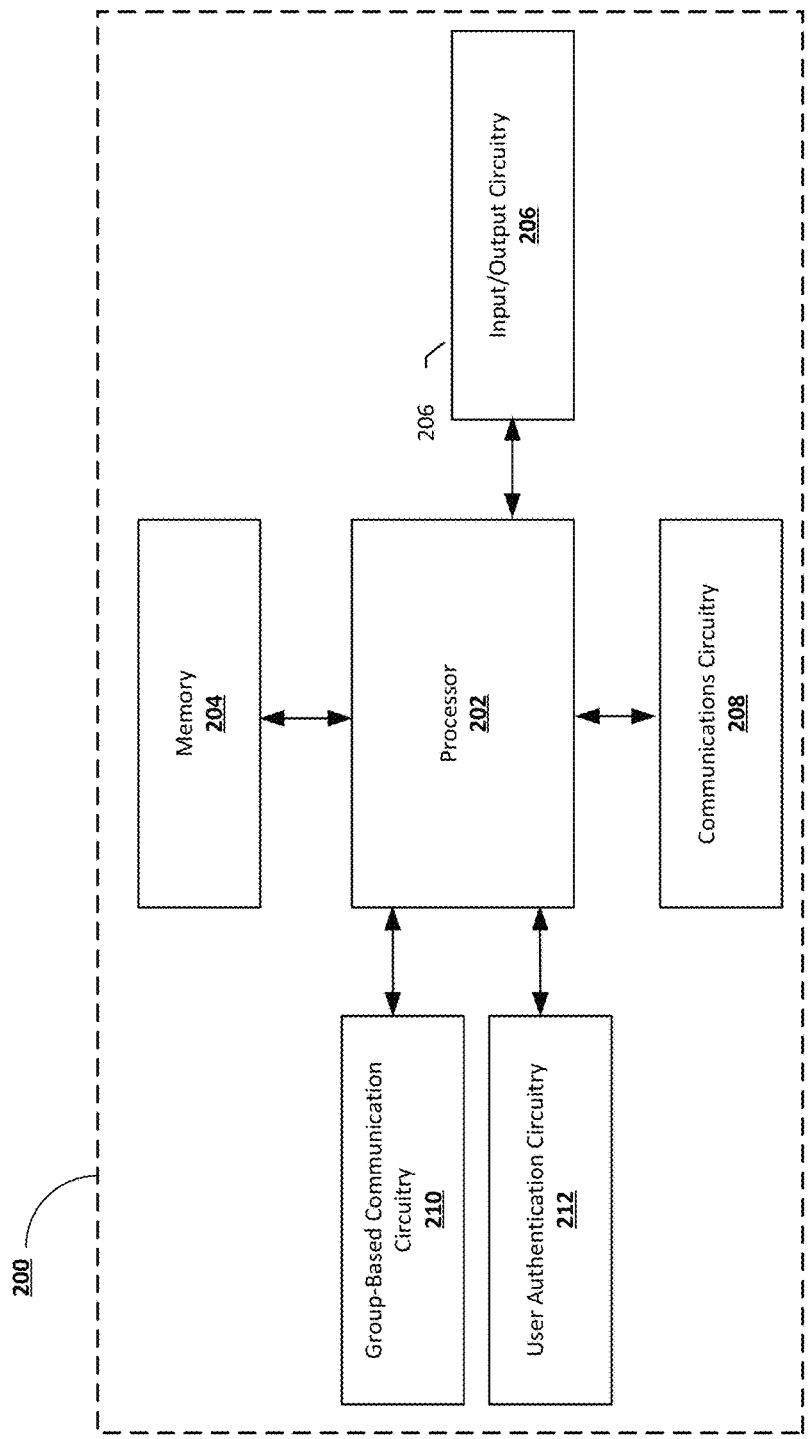

FIG. 2 is a schematic diagram of an example apparatus for a group-based communication server in accordance with one embodiment of the present invention.

Figure 3:
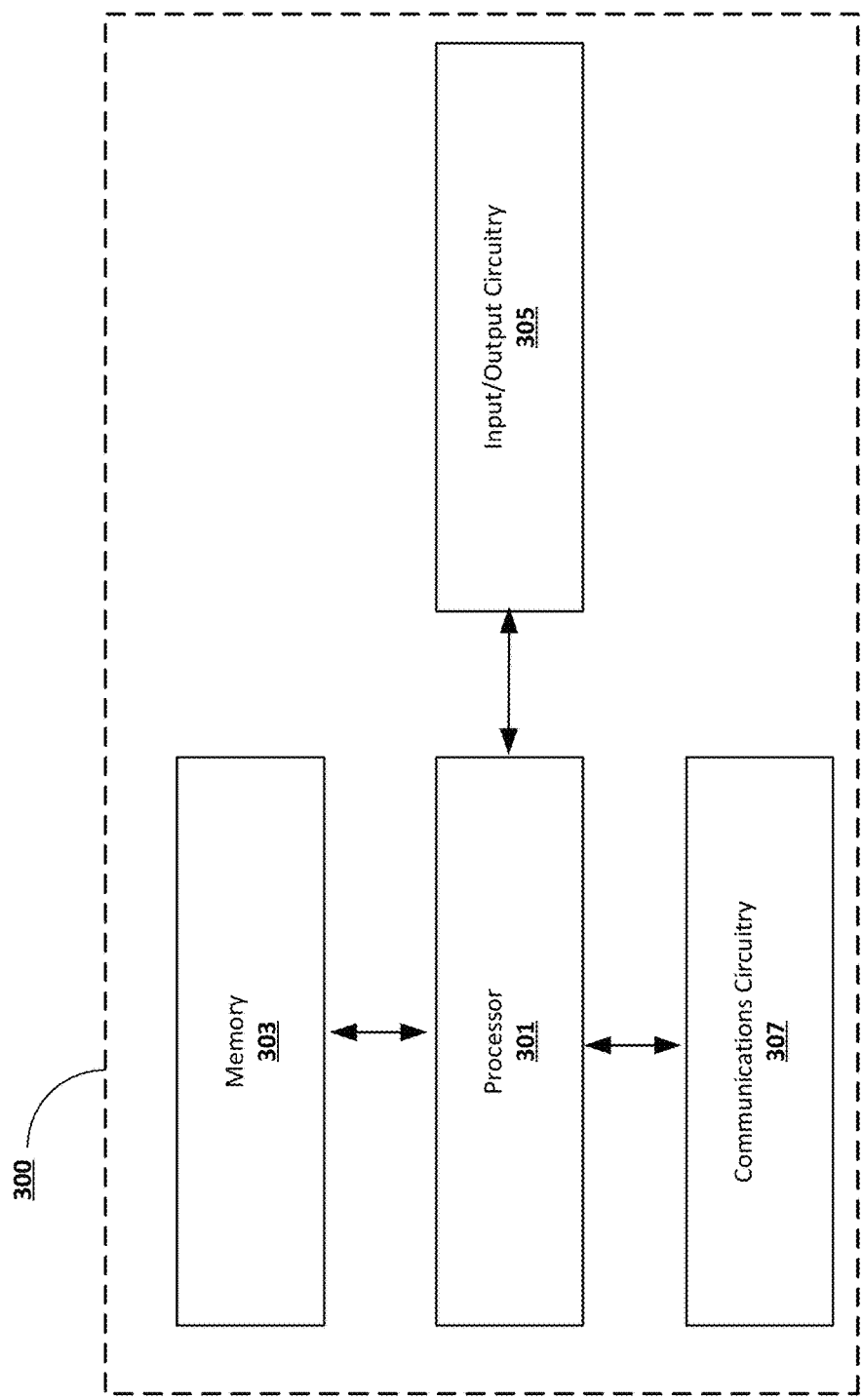

FIG. 3 is a schematic diagram of an example apparatus for a client device in accordance with one embodiment of the present invention.

Figure 4:
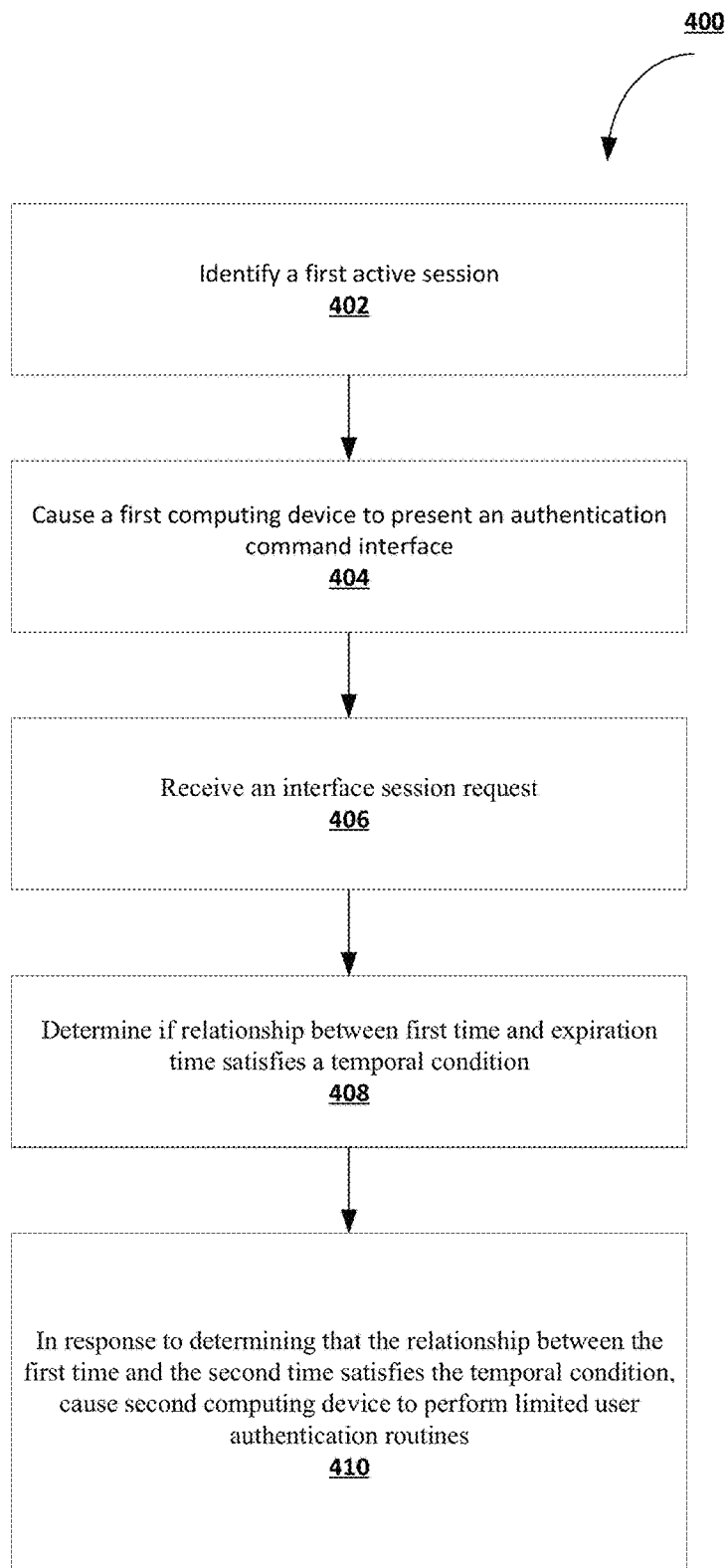

FIG. 4 is a flow diagram of a process for multi-device user authentication in accordance with one embodiment of the present invention.

Figure 5:
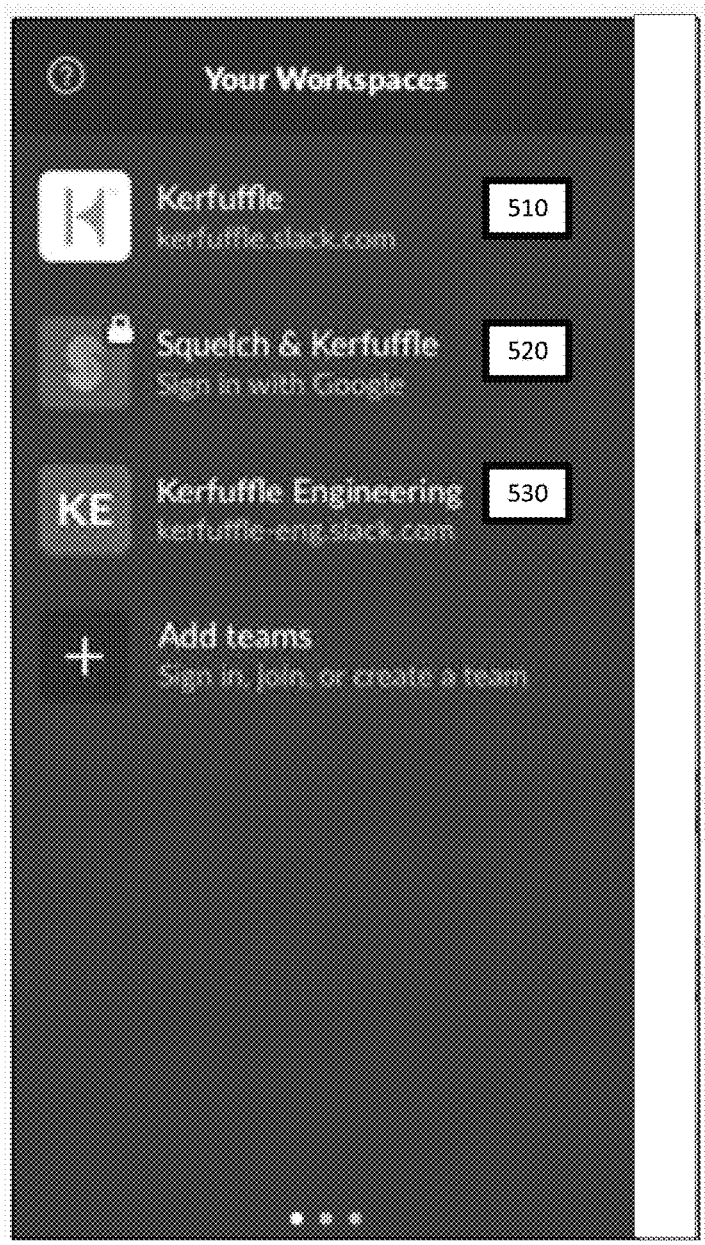

FIG. 5 is an example interface selection user interface in accordance with one embodiment of the present invention.

Figure 6:
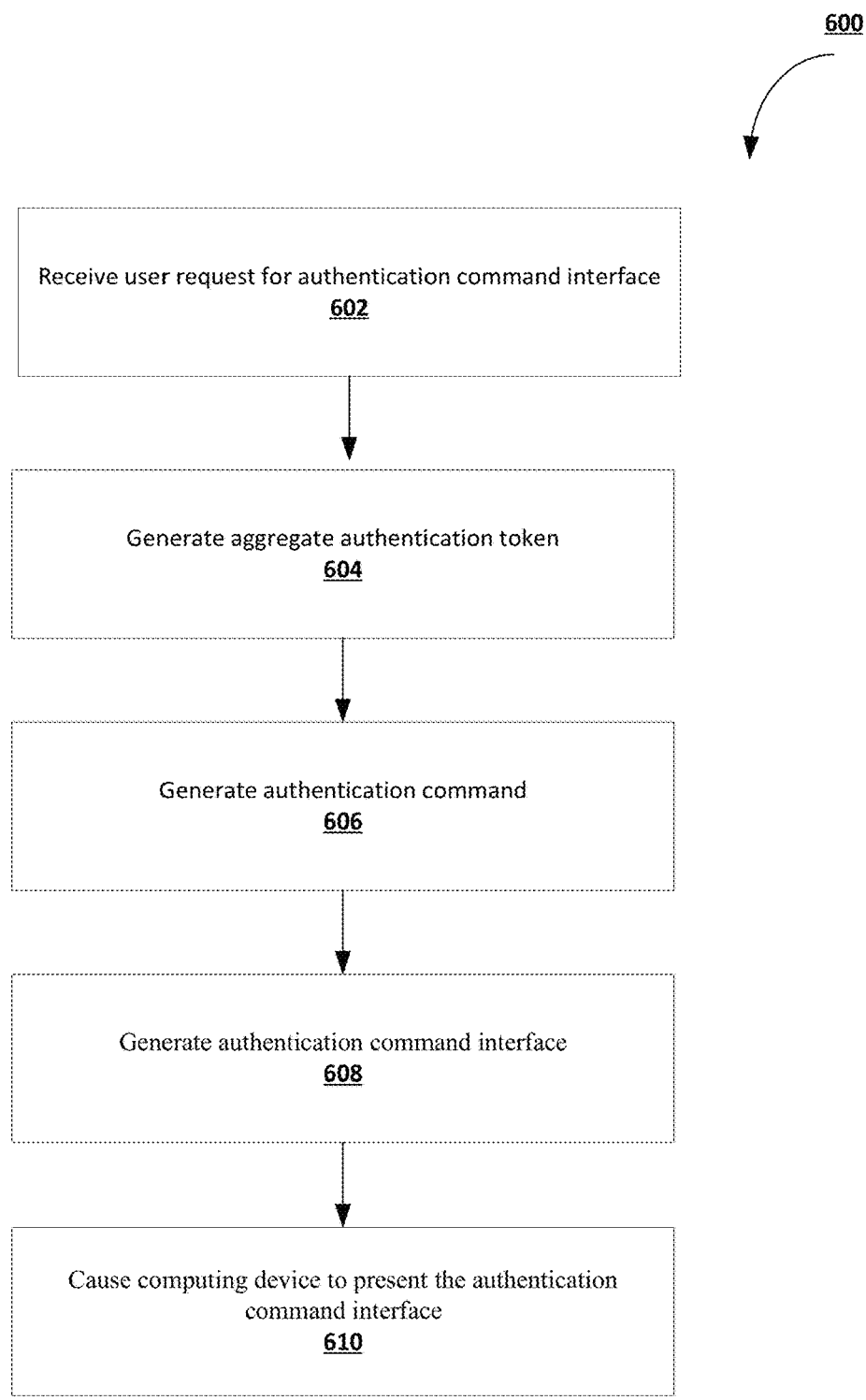

FIG. 6 is a flow diagram of a process for causing a computing device to present an authentication command interface in accordance with one embodiment of the present invention.

Figure 7:
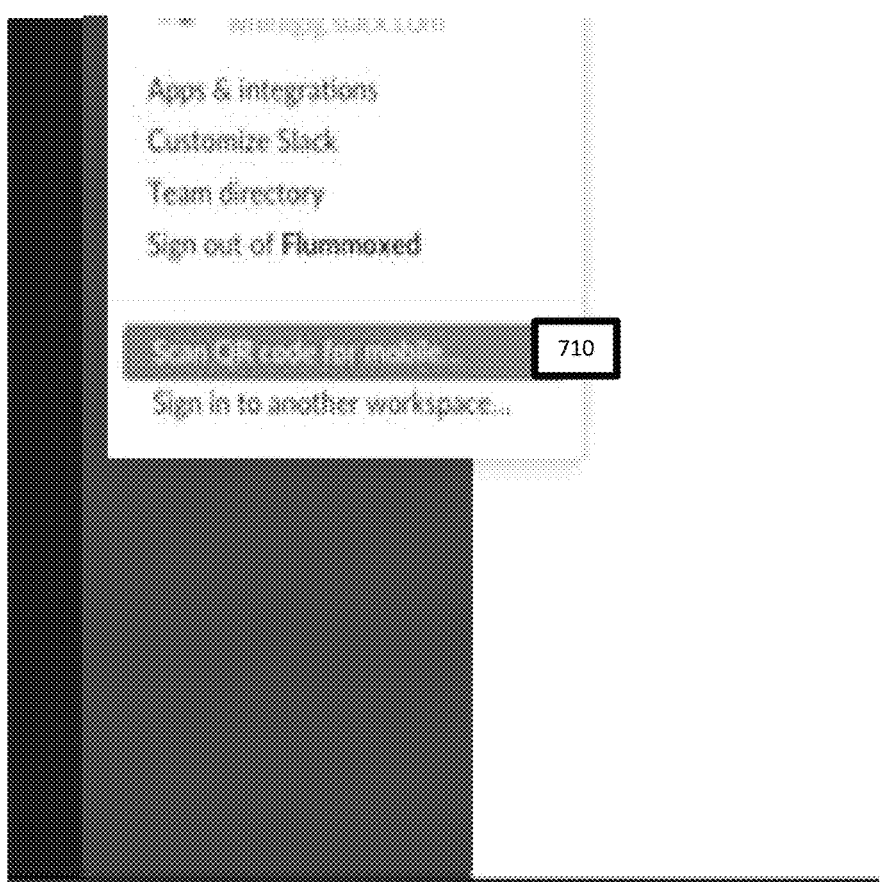

FIG. 7 is an example command interface generation user interface in accordance with one embodiment of the present invention.

Figure 8:
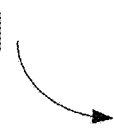

FIG. 8 is an example authentication record data structure in accordance with one embodiment of the present invention.

Figure 9:
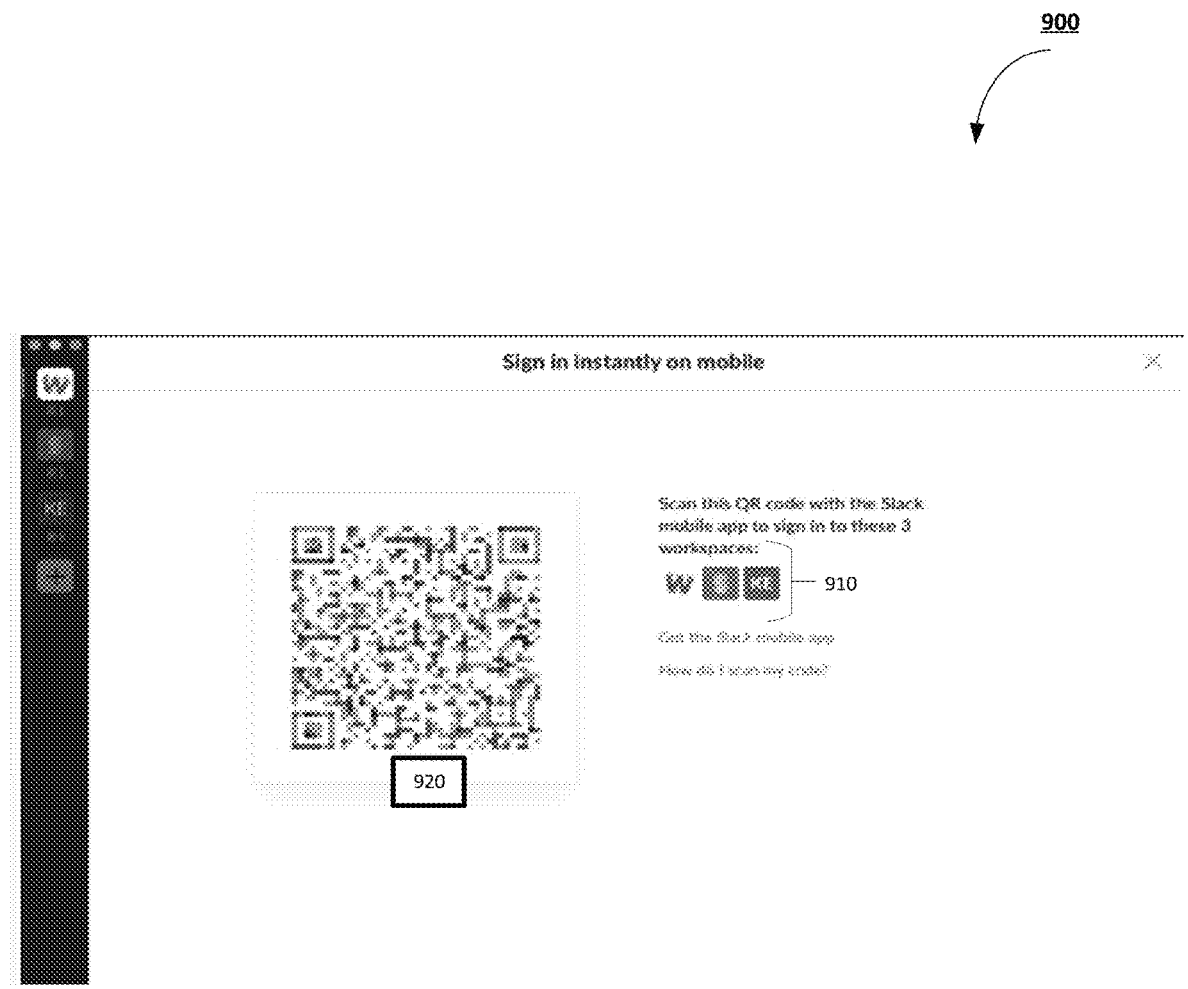

FIG. 9 is an example command interface presentation user interface in accordance with embodiments of the present invention.

Figure 10:
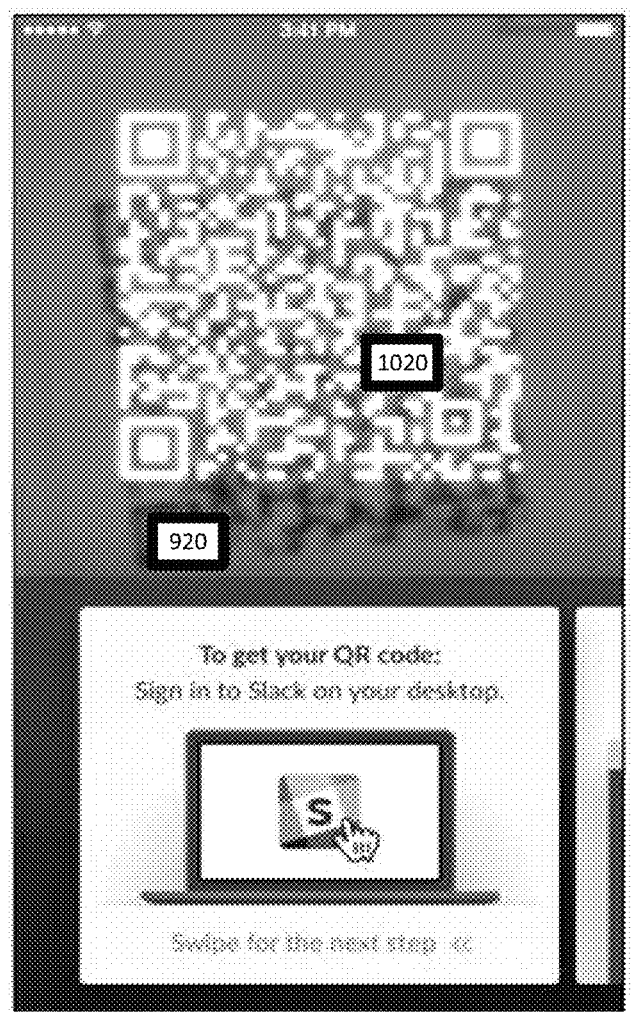

FIG. 10 is an example command interface interaction user interface in accordance with embodiments of the present invention.

Figure 11:
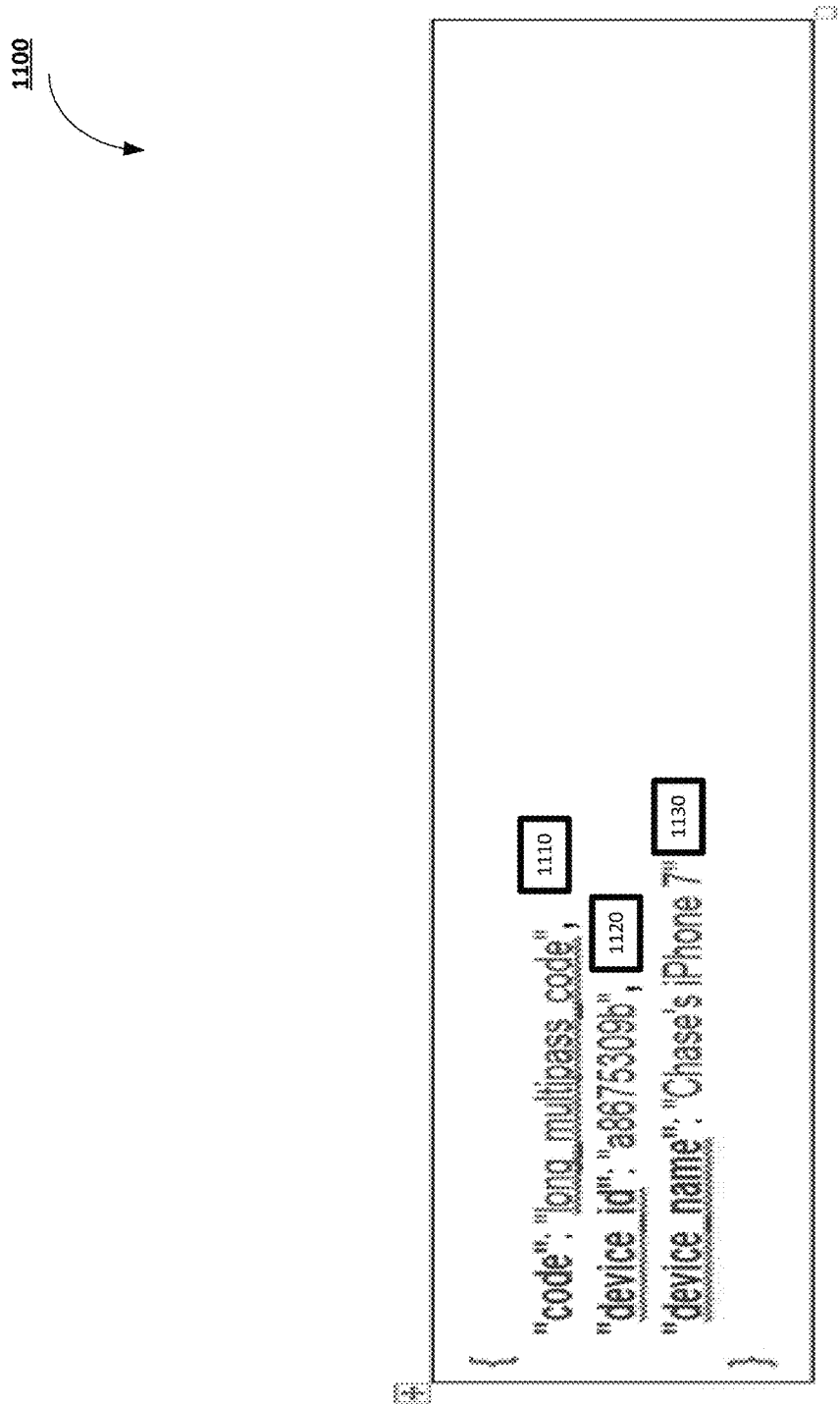

FIG. 11 is an example aggregate authentication invocation data structure in accordance with one embodiment of the present invention.

Figure 12:
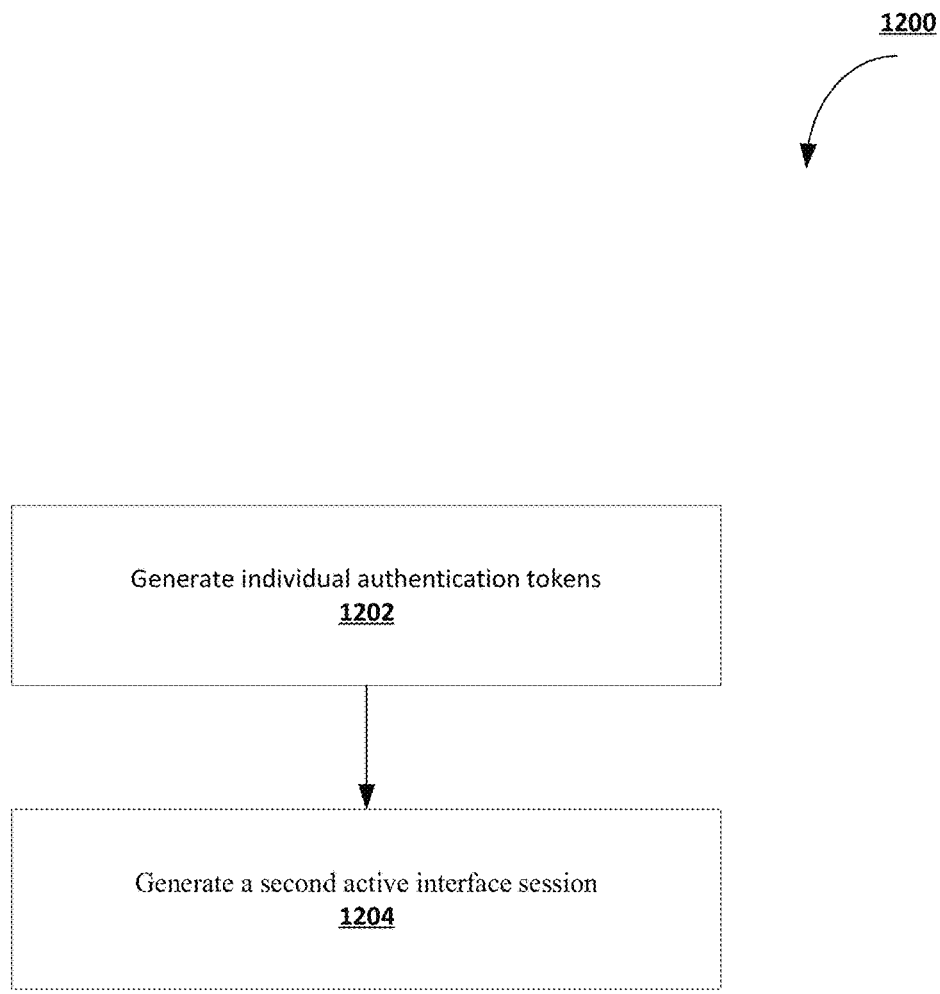

FIG. 12 is a flow diagram of a process for performing a limited user authentication routine in accordance with one embodiment of the present invention.

Figure 13:

FIG. 13 is an example individual authentication information data structure in accordance with one embodiment of the present invention.

Figure 14:
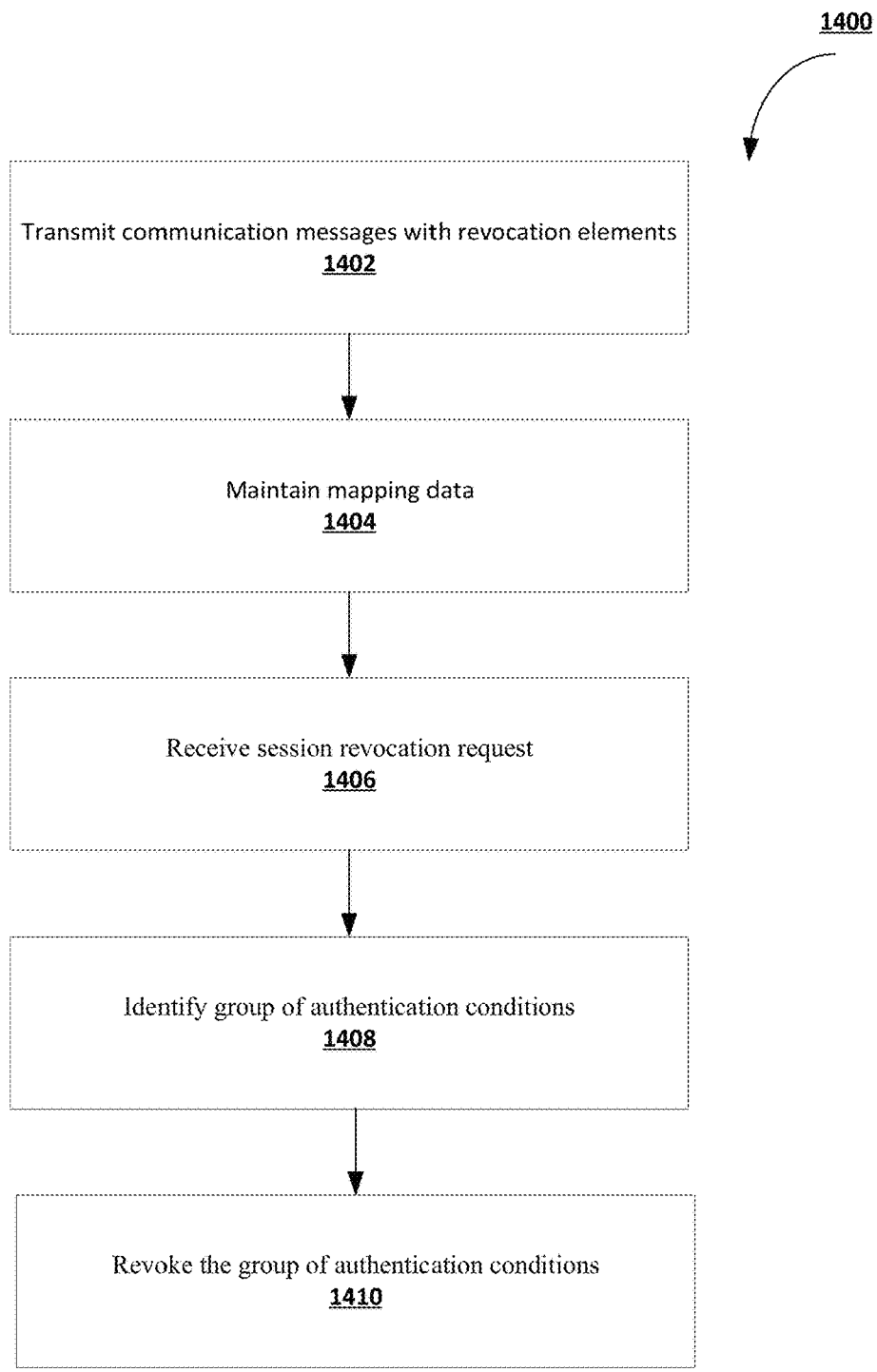

FIG. 14 is a flow diagram of a process for revoking active authentication conditions in accordance with one embodiment of the present invention.

Figure 15:
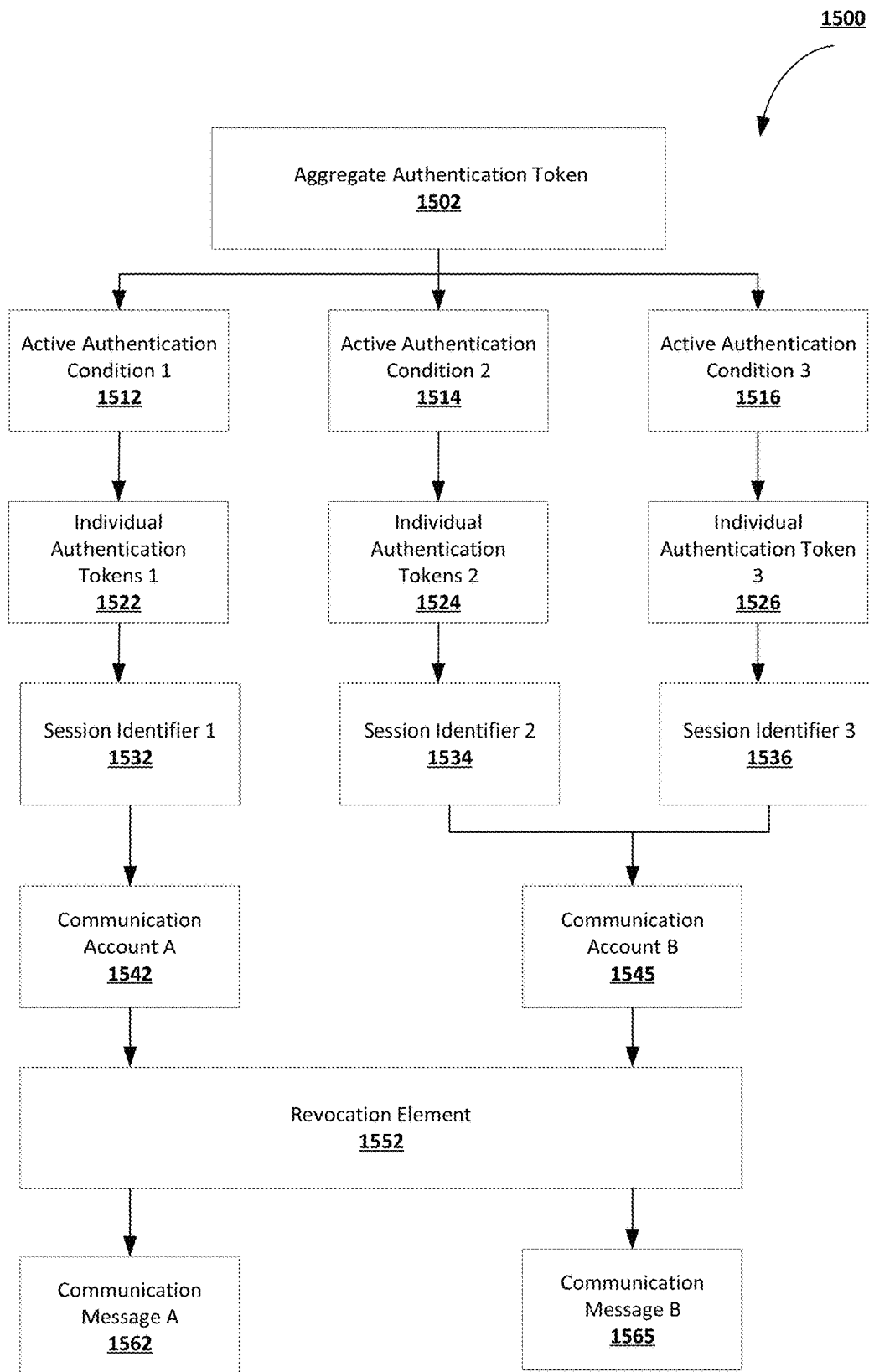

FIG. 15 is an operational example of a data hierarchy in accordance with one embodiment of the present invention.

Figure 16:
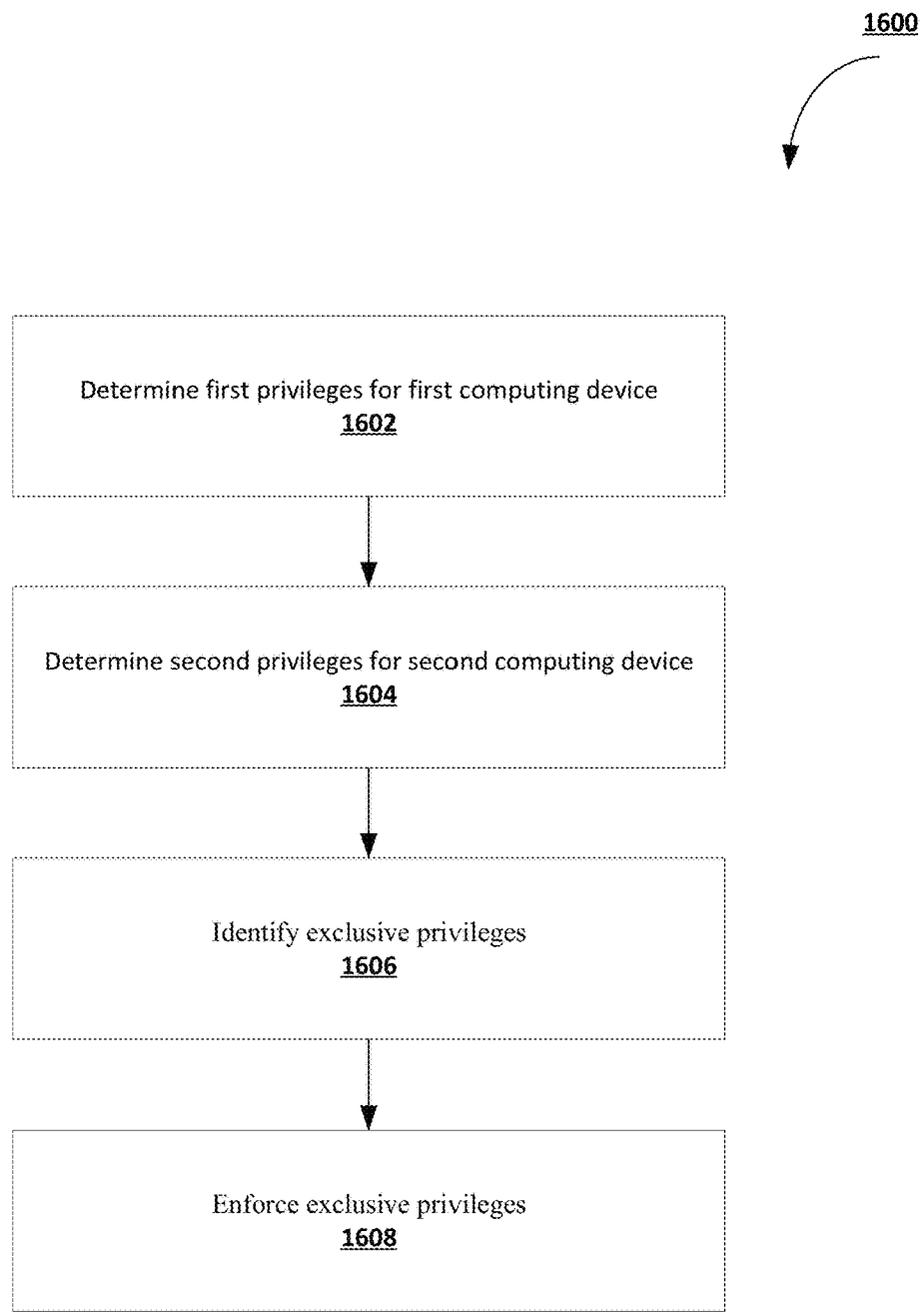

FIG. 16 is a flow diagram of a process for enforcing exclusive privileges in accordance with one embodiment of the present invention.

DETAILED DESCRIPTION OF VARIOUS EMBODIMENTS

Various embodiments of the present invention are described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. The term "or" is used herein in both the alternative and conjunctive sense, unless otherwise indicated. The terms "illustrative," "example," and "exemplary" are used to be examples with no indication of quality level. Like numbers refer to like elements throughout.

The term "comprising" means "including but not limited to," and should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure, and may be included in more than one embodiment of the present disclosure (importantly, such phrases do not necessarily refer to the same embodiment).

Overview

Various embodiments of the present invention relate generally to multi-device user authentication in group-based communication systems. More specifically, various embodiments of the present invention are related to a group-based communication platform that provides multi-device user authentication using authentication command interfaces and/or limited user authentication routines. Various embodiments described hereinafter provide many technical improvements over computer functionalities by enhancing user experience in group-based communication systems. In addition, various embodiments described herein provide many technical improvements over computer functionalities by providing mechanisms for user authentication that do not rely on communication accounts such as email accounts, thus enhancing security of group-based communication systems. Furthermore, various embodiments described herein provide many technical improvements over computer functionalities by removing the need to rely on availability and/or operability of external communication devices (e.g., smartphones) to transmit user authentication tokens, thus increasing reliability of login functionalities in group-based communication systems. Moreover, various embodiments described herein provide many technical improvements over computer functionalities by enabling individual and/or collective revocation of active authentication conditions using revocation elements and associated mapping data.

Group-based communication systems present unique challenges for multi-device user authentication because each active interface session of a group-based communication system on a first computing device may be associated with multiple group-based communication interfaces. Typically, to enable access to n group-based communication interfaces, a system needs to enable n corresponding active authentication conditions. Enabling each active authentication condition may in turn require an average of m user actions (e.g., entering passwords, entering secondary authentication codes, etc.). Thus, to enable n authentication conditions on a single device, the user may need to perform n*m actions, with the value of m being higher in proportion to authentication security of the n group-based communication interfaces. Absent multi-device user authentication with limited user authentication routines, even after enabling n active authentication conditions on the first computing device, the user may need to perform n*m actions on any subsequent computing device. Therefore, to enable n authentication conditions on d computing devices, a user may have to perform (d−1)*n*m actions. For example, the user may need to repeat supplying multiple types of authentication input values using a second computing device, an often tedious and time-consuming task.

Various embodiments of the present invention enhance user experience in group-based communication systems by enabling multi-device user authentication in such systems using authentication command interfaces and/or limited user authentication routines. Enabling multi-device user authentication using authentication command interfaces can enhance user experience by reducing the need for users to perform excessive actions to call authentication commands other than causing receipt of the authentication command interfaces on subsequent computing devices. Moreover, enabling multi-device user authentication using limited user authentication routines that use aggregate authentication tokens can enhance user experience by eliminating the need for users to provide individual authentication tokens for each group-based communication interface of a group-based communication system. As a result, enhancements to user experience provided by various embodiments of the present invention can reduce the number of user actions required to enable n active authentication conditions on d devices to a constant number of actions to enable some or all of then active authentication conditions collectively on each of the d devices.

Importantly, enhancements to user experience provided by various embodiments of the present invention are not likely to come at the expense of reduced authentication security for group-based communication systems. Moreover, various embodiments of the present invention enhance authentication security by enforcing an expiration condition for any aggregate authentication token and/or by enabling user revocation of authentication conditions.

Definitions

As used herein, the terms "data," "content," "digital content," "digital content object," "information," and similar terms may be used interchangeably to refer to data capable of being transmitted, received, and/or stored in accordance with embodiments of the present invention. Thus, use of any such terms should not be taken to limit the spirit and scope of embodiments of the present invention. Further, where a computing device is described herein to receive data from another computing device, it will be appreciated that the data may be received directly from another computing device or may be received indirectly via one or more intermediary computing devices, such as, for example, one or more servers, relays, routers, network access points, base stations, hosts, and/or the like (sometimes referred to herein as a "network"). Similarly, where a computing device is described herein to send data to another computing device, it will be appreciated that the data may be sent directly to another computing device or may be sent indirectly via one or more intermediary computing devices, such as, for example, one or more servers, relays, routers, network access points, base stations, hosts, and/or the like.

The term "circuitry" should be understood broadly to include hardware and, in some embodiments, software for configuring the hardware. With respect to components of the apparatus, the term "circuitry" as used herein should therefore be understood to include particular hardware configured to perform the functions associated with the particular circuitry as described herein. For example, in some embodiments, "circuitry" may include processing circuitry, storage media, network interfaces, input/output devices, and the like.

The term "user" should be understood to refer to an individual, group of individuals, business, organization, and the like. The users referred to herein may access a group-based communication platform using client devices (as defined herein).

The term "user identifier" refers to an identifier that uniquely identifies information stored in a group-based communication platform that is related to a user. Information related to a user may be stored in a "user profile," "user account," or "user account details," which may include one or more group-based communication channel identifiers associated with group-based communication channels that the user has been granted access privileges to, one or more group identifiers for groups that the user has been granted access privileges to, an indication as to whether the user is an owner of any group-based communication channels, an indication as to whether the user has any group-based communication channel restrictions, a plurality of messages, a plurality of emojis, a plurality of conversations, a plurality of conversation topics, an avatar, an email address, a real name (e.g., John Doe), a username (e.g., jdoe), a password, a real name, a time zone, a status, and the like. The user account details can include a subset designation of user credentials, such as, for example, login information for the user including the user's username and password.

The term "client device" refers to computer hardware and/or software that is configured to access a service made available by a server. The server is often (but not always) on another computer system, in which case the client device accesses the service by way of a network. Client devices may include, without limitation, smart phones, tablet computers, laptop computers, wearables, personal computers, enterprise computers, and the like.

The term "user authentication" refers to controlling nature and/or extent of access to one or more computing resources by a computing device. A computer-implemented routine directed to user authentication is a "user authentication routine." For example, a computer system executing a user authentication routine may enable access to a particular computing resource by an access-seeking computing device if the computer system determines that a user profile associated with a session request by the access-seeking computing device is authorized to access the particular computing resource. A user authentication routine may condition enabling access to a particular computing resource on receipt of one or more "authentication tokens," as the term is defined below, by a computing device. Further, a user authentication routine may be configured to enable an "active authentication condition," as defined below, on a computing device.

The term "multi-device user authentication," a type of user authentication, refers to controlling nature and/or extent of access to one or more computing resources by a computing device based on a determination about nature and/or extent of access to the one or more computing resources by one or more other computing devices. A computer-implemented routine directed to multi-device user authentication is a "multi-device user authentication routine." For example, a computer system executing a multi-device user authentication routine may: (i) identify that a first user profile is authorized to access a particular resource as part of an active session on a first computing device; (ii) receive a session request by a second computing device to access the particular resource, where the session request is associated with a second user profile; (iii) determine if the first user profile and the second user profile have sufficient identity correlation; and (iv) in response to determining that that the first user profile and the second user profile have sufficient identity correlation, enable the second computing resource to access the particular resource.

The term "group-based communication system" refers to a communications software platform and associated hardware that is configured to support and maintain a plurality of group-based communication interfaces and all associated functionality. Group-based communication system users are organized into organization groups (e.g., employees of different companies may be separate organization groups) and each group interacts with the system via a respective "group-based communication interface," as the term is defined below. For example, the group-based communication system might support, among others, a Slack Corporation group-based communication interface and an ACME Corporation group-based communication interface. Example group-based communication systems comprise supporting servers, client devices, and third party resources.

The term "group-based communication interface" refers to a virtual communications environment configured to facilitate user interaction with a group-based communications system. Each group-based communication interface is accessible and viewable to a select group of users, such as a group of employees of a business or organization (e.g., the Slack Corp. interface would be accessible and viewable to the Slack employees but the ACME Corporation group-based communication interface would not be accessible and viewable to Slack employees). The group-based communication interface includes one or more "group-based communication channels" (e.g., a marketing channel, sales channel, accounting channel, etc.), as the term is defined below.

The term "group-based communication channel" refers to a virtual communications environment or feed that is configured to display group-based messages posted by channel members (e.g., validated users accessing the environment using client devices) that are viewable only to the members of the group. The format of the group-based communication channel may appear differently to different members of the group-based communication channel; however, the content of the group-based communication channel (i.e., group-based messages) will be displayed to each member of the group-based communication channel. For instance, a common set of group-based messages will be displayed to each member of the respective group-based communication channel such that the content of the group-based communication channel (i.e., group-based messages) will not vary per member of the group-based communication channel.

The term "active interface session" refers to a computing session during which a computing device is enabled access to at least one group-based communication interface of a group-based communication system. For example, an active interface session may describe the computing session that occurs between a time at which a user profile logs into a group-based communication system and a time at which the user profile logs out of the group-based communication system. During the noted period of time, a computing device using which the user profile seeks to access the group-based communication system may have access to one or more group-based communication interfaces of the group-based communication system associated with the user profile. An "active interface session" may be associated with one or more "active authentication conditions," as defined below.

The term "interface session request" refers to a request by a computing device to access one or more group-based communication interfaces of a group-based communication system. An interface session request may indicate receipt by a computing device of an "aggregation authentication token," as defined below.

The term "session identifier" refers to digital information that identify an active computing session, such as an active interface session. For example, when a computing device generates an active interface session, the computing device may transmit a session identifier to a computing device that is configured to be a party to the active interface session.

The term "active authentication condition" refers to digital information that, when processed by a computer processor, enable a computing device to access one or more computing resources (e.g., at least one group-based communication interface of a group-based communication system). For example, an active authentication condition may be digital information (e.g., an entry in an authentication database) indicating one or more of the following: (i) that a user profile associated with a session request by the access-seeking computing device is authorized to use a group-based communication interface; and (ii) that a user profile associated with a session request by an access-seeking computing device is a party to an active interface session. An active authentication condition may be enabled (e.g., set as an entry in an authentication database) by a user authentication routine.

The term "authentication command" refers to digital information that, when processed by a computer processor, cause an execution of a user authentication routine on a computing device. For example, an authentication command may include computer code invoking a user authentication routine on a computing device that includes the computer processor that processes the authentication command. As another example, an authentication command may include invokes a link to an online resource that executes a user authentication routine. An authentication command may be associated with (e.g., identify and/or include) an "authentication token," as defined below.

The term "authentication command interface" refers to a representation of an authentication command presented through one or more signals (e.g., audiovisual signals, electronic signals, etc.) configured to be received by an end user and/or an end user device. For example, an authentication command interface may be a Quick Response (QR) code representation of an authentication command. As another example, an authentication command interface may be a representation of an authentication command presented to a user through near-field communication (NFC), iBeacon, or Bluetooth signals. As yet another example, an authentication command interface may be a representation of an authentication command presented to a user through clickable visual signals.

The term "authentication token" refers to digital information that, when processed by a computer processor, indicate that a computing device is authorized to access one or more particular computing resource. Examples of authentication tokens include passwords, pin numbers, information describing finger prints or other bodily features of users, random-generated access codes (e.g., codes sent to a secondary computing device of a user), digital signals indicating physical proximity of a particular computing device (e.g., a Bluetooth signal), etc. An authentication token may be supplied by an end user of a computing device or may be automatically generated by a computing device.

The term "individual authentication token" refers to an authentication token that, when processed by a computer processor, indicates that a computing device is authorized to access one particular group-based communication interface of a group-based communication system. For example, the individual authentication token associated with a particular group-based communication interface may include a combination of a username and a password for accessing the particular group-based communication interface. As another example, the individual authentication token associated with a particular group-based communication interface may include a random-generated access code for accessing the particular group-based communication interface.

The term "aggregate authentication token" refers to an authentication token that, when processed by a computer processor, can indicate that a computing device is authorized to access one or more particular group-based communication interfaces of a group-based communication system. Thus, in contrast to an individual authentication token, an aggregate authentication token may be associated with more than one group-based communication interface of a group-based communication system. For example, an aggregate authentication token may be associated with all of the group-based communication interfaces of a group-based communication system that are associated with an access-seeking user profile.

The term "limited user authentication routine" refers to a user authentication routine that controls nature and/or extent of access to multiple group-based communication interfaces of a group-based communication system based on an authentication command that is associated with at least one aggregate authentication token. For example, a computer system implementing a limited user authentication routine may enable access to all of the group-based communication interfaces associated with a user profile based on an authentication command associated with one aggregate authentication token, where the aggregate authentication token is associated with all of the group-based communication interfaces associated with the user profile.

The term "revocation element" refers to digital information that, when processed by a computer processor, cause the computer processor to revoke access to one or more computer resources (e.g., at least one group-based communication interface in a group-based communication system) by a computing device. For example, the revocation element may be a link to an online resources that invokes a computer-implemented routine for revoking access to a group-based communication interface by a computing device.

Example System Architecture for Implementing Embodiments of the Present Invention Methods, apparatuses, and computer program products of the present disclosure may be embodied by any of a variety of devices. For example, the method, apparatus, and computer program product of an example embodiment may be embodied by a networked device (e.g., an enterprise platform), such as a server or other network entity, configured to communicate with one or more devices, such as one or more client devices. Additionally or alternatively, the computing device may include fixed computing devices, such as a personal computer or a computer workstation. Still further, example embodiments may be embodied by any of a variety of mobile devices, such as a portable digital assistant (PDA), mobile telephone, smartphone, laptop computer, tablet computer, wearable, or any combination of the aforementioned devices.

FIG. 1 illustrates an example system architecture 100 within which embodiments of the present invention may operate. A user may access a group-based communication platform 105 via a communication network 103 using one or more client devices 101A-B, such as the first computing device 101A and the second computing device 101B. The group-based communication platform 105 may comprise a group-based communication server 106 in communication with at least one group-based communication repository 107 and at least one user authentication repository 108.

Communication network 103 may include any wired or wireless communication network including, for example, a wired or wireless local area network (LAN), personal area network (PAN), metropolitan area network (MAN), wide area network (WAN), or the like, as well as any hardware, software and/or firmware required to implement it (such as, e.g., network routers, etc.). For example, communication network 103 may include a cellular telephone, an 902.11, 902.16, 902.20, and/or WiMax network. Further, the communication network 103 may include a public network, such as the Internet, a private network, such as an intranet, or combinations thereof, and may utilize a variety of networking protocols now available or later developed including, but not limited to TCP/IP based networking protocols. For instance, the networking protocol may be customized to suit the needs of the group-based communication system. In one embodiment, the protocol is a custom protocol of JSON objects sent via a Websocket channel. In one embodiment, the protocol is JSON over RPC, JSON over REST/HTTP, and the like.

A client device 101A-B may be any computing device as defined above. Electronic data received by the group-based communication platform 105 from the client devices 101A-B may be provided in various forms and via various methods. For example, the client devices 101A-B may include desktop computers, laptop computers, smartphones, netbooks, tablet computers, wearables, and the like. An example architecture for a client device 101A-B is depicted in the apparatus 300 of FIG. 3.

In embodiments where a client device 101A-B is a mobile device, such as a smart phone or tablet, the client device 101A-B may execute an "app" to interact with the group-based communication platform 105. Such apps are typically designed to execute on mobile devices, such as tablets or smartphones. For example, an app may be provided that executes on mobile device operating systems such as iOS®, Android®, or Windows®. These platforms typically provide frameworks that allow apps to communicate with one another and with particular hardware and software components of mobile devices. For example, the mobile operating systems named above each provide frameworks for interacting with location services circuitry, wired and wireless network interfaces, user contacts, and other applications. Communication with hardware and software modules executing outside of the app is typically provided via application programming interfaces (APIs) provided by the mobile device operating system. Additionally or alternatively, the client device 101A-B may interact with the group-based communication platform 105 via a web browser. As yet another example, the client device 101A-B may include various hardware or firmware designed to interface with the group-based communication platform 105.

The group-based communication server 106 may be embodied as a computer or computers as known in the art. An example architecture for the group-based communication server 106 is depicted in the apparatus 200 of FIG. 2. The group-based communication server 106 may provide for sending electronic data and/or receiving electronic data from various sources, including but not limited to the client devices 101A-B. For example, the group-based communication server 106 may receive from the first computing device 101A electronic data indicating a first active interface session on the first computing device 101A. As another example, the group-based communication server 106 may send electronic data to the first computing device 101A causing the first computing device 101A to present an authentication command interface. As a further example, the group-based communication server 106 may receive electronic data from the second computing device 101B indicating receipt of an interface session request by the second computing device 101B and/or a first time associated with such receipt. As a yet another example, the group-based communication server 106 may send electronic data to the second computing device 101B causing the second computing device 101B to perform one or more limited user authentication routines.

The group-based communication repository 107 may be embodied as a data storage device such as a Network Attached Storage (NAS) device or devices, or as a separate database server or servers. The group-based communication repository 107 includes electronic data accessed and stored by the group-based communication server 106 to facilitate the operations of the group-based communication platform 105. For example, the group-based communication repository 107 may include, without limitation, a plurality of shared interfaces, interface annotations, interface annotation instructions, display input data, etc. organized within the group-based communication repository 107.

In one embodiment, the group-based communication server 106 sends to and/or receives from the group-based communication repository 107 electronic data electronic data accessed and stored by the group-based communication server 106 to facilitate the operations of the group-based communication platform 105. For example, the group-based communication server 106 may receive from the group-based communication repository 107 electronic data indicating any digital content in the group-based communication interfaces associated with the group-based communication platform 105. As another example, the group-based communication server 106 may send to the group-based communication repository 106 electronic data indicating any modifications and/or additions to any group-based communication messages.

The user authentication repository 108 may also be embodied as a data storage device such as a Network Attached Storage (NAS) device or devices, or as a separate database server or servers. The user authentication repository 108 includes electronic data accessed and stored by the group-based communication server 106 to facilitate user authentication for the group-based communication platform 105. For example, the group-based communication repository 107 may include, without limitation, aggregate authentication tokens and/or individual authentication tokens.

In one embodiment, the group-based communication server 106 may send to and/or receive from the user authentication repository 108 electronic data related to user authentication and/or receive from the user authentication repository 108 electronic data related to user authentication. For example, the group-based communication server 106 may receive from the user authentication repository 108 electronic data indicating aggregate authentication tokens and/or individual authentication tokens. As another example, the group-based communication server 106 may send to the user authentication repository 108 electronic data indicating any modifications and/or additions to any aggregate authentication tokens and/or any individual authentication tokens. As yet another example, the group-based communication server 106 may send to the user authentication repository 108 information relating to revocation of any aggregate authentication tokens and/or any individual authentication tokens (e.g., information relating to creation and/or activation of revocation elements).

An example architecture for the group-based communication server 106 is depicted in the apparatus 200 of FIG. 2. As depicted in FIG. 2, the apparatus 200 includes processor 202, memory 204, input/output circuitry 206, communications circuitry 208, group-based communication circuitry 210, and user authentication circuitry 212. The apparatus 200 may be configured to execute the operations described herein with respect to FIGS. 1-17. Although these components 202-210 are described with respect to functional limitations, it should be understood that the particular implementations necessarily include the use of particular hardware. It should also be understood that certain of these components 202-212 may include similar or common hardware. For example, two sets of circuitries may both leverage use of the same processor, network interface, storage medium, or the like to perform their associated functions, such that duplicate hardware is not required for each set of circuitries.

In one embodiment, the processor 202 (and/or co-processor or any other processing circuitry assisting or otherwise associated with the processor) may be in communication with the memory 204 via a bus for passing information among components of the apparatus. The memory 204 is non-transitory and may include, for example, one or more volatile and/or non-volatile memories. In other words, for example, the memory 204 may be an electronic storage device (e.g., a computer-readable storage medium). The memory 204 may be configured to store information, data, content, applications, instructions, or the like for enabling the apparatus to carry out various functions in accordance with example embodiments of the present invention.

The processor 202 may be embodied in a number of different ways and may, for example, include one or more processing devices configured to perform independently. In some preferred and non-limiting embodiments, the processor 202 may include one or more processors configured in tandem via a bus to enable independent execution of instructions, pipelining, and/or multithreading. The use of the term "processing circuitry" may be understood to include a single core processor, a multi-core processor, multiple processors internal to the apparatus, and/or remote or "cloud" processors.

In some preferred and non-limiting embodiments, the processor 202 may be configured to execute instructions stored in the memory 204 or otherwise accessible to the processor 202. In some preferred and non-limiting embodiments, the processor 202 may be configured to execute hard-coded functionalities. As such, whether configured by hardware or software methods, or by a combination thereof, the processor 202 may represent an entity (e.g., physically embodied in circuitry) capable of performing operations according to an embodiment of the present invention while configured accordingly. Alternatively, as another example, when the processor 202 is embodied as an executor of software instructions, the instructions may specifically configure the processor 202 to perform the algorithms and/or operations described herein when the instructions are executed.

As just one example, the processor 202 may be configured to maintain one or more communication channels connecting a plurality of client devices 101A-B to enable message sharing/dissemination therebetween. The processor 202 ensures that messages intended for exchange between the client devices 101A-B within the particular communication channel are properly disseminated to those client devices 101A-B for display within respective display windows provided via the client devices 101A-B.

Moreover, the processor 202 may be configured to synchronize messages exchanged on a particular communication channel with a database for storage and/or indexing of messages therein. In certain embodiments, the processor 202 may provide stored and/or indexed messages to the interface computing entity 109 for dissemination to client devices 101A-B.

In one embodiment, the apparatus 200 may include input/output circuitry 206 that may, in turn, be in communication with processor 202 to provide output to the user and, in one embodiment, to receive an indication of a user input. The input/output circuitry 206 may comprise a user interface and may include a display, and may comprise a web user interface, a mobile application, a client device, a kiosk, or the like. In one embodiment, the input/output circuitry 206 may also include a keyboard, a mouse, a joystick, a touch screen, touch areas, soft keys, a microphone, a speaker, or other input/output mechanisms. The processor and/or user interface circuitry comprising the processor may be configured to control one or more functions of one or more user interface elements through computer program instructions (e.g., software and/or firmware) stored on a memory accessible to the processor (e.g., memory 204, and/or the like).

The communications circuitry 208 may be any means such as a device or circuitry embodied in either hardware or a combination of hardware and software that is configured to receive and/or transmit data from/to a network and/or any other device, circuitry, or module in communication with the apparatus 200. In this regard, the communications circuitry 208 may include, for example, a network interface for enabling communications with a wired or wireless communication network.

For example, the communications circuitry 208 may include one or more network interface cards, antennae, buses, switches, routers, modems, and supporting hardware and/or software, or any other device suitable for enabling communications via a network. Additionally or alternatively, the communications circuitry 208 may include the circuitry for interacting with the antenna/antennae to cause transmission of signals via the antenna/antennae or to handle receipt of signals received via the antenna/antennae.

Group-based communication circuitry 210 includes hardware configured to execute operations in response to requests by client devices 101A-B when such requests require retrieval and/or modification of data stored in the group-based communication repository 107. For example, the group-based communication circuitry 210 may process a request to create a group-based communication interface. The group-based communication circuitry 210 may utilize processing circuitry, such as the processor 202, to perform these actions. However, it should also be appreciated that, In one embodiment, the group-based communication circuitry 210 may include a separate processor, specially configured Field Programmable Gate Array (FPGA), or Application Specific Integrated Circuit (ASIC) for performing the functions described herein. The group-based communication circuitry 210 may be implemented using hardware components of the apparatus configured by either hardware or software for implementing these planned functions.

User authentication circuitry 212 includes hardware configured to execute operations in response to requests by client devices 101A-B when such requests require retrieval and/or modification of data in the user authentication repository 108. For example, the user authentication circuitry 212 may process a request to enable an active authentication condition on a client computing device 101A-B. The user authentication circuitry 212 may utilize processing circuitry, such as the processor 202, to perform these actions. However, it should also be appreciated that, In one embodiment, the user authentication circuitry 212 may include a separate processor, specially configured Field Programmable Gate Array (FPGA), or Application Specific Integrated Circuit (ASIC) for performing the functions described herein. The user authentication circuitry 212 may be implemented using hardware components of the apparatus configured by either hardware or software for implementing these planned functions.

It is also noted that all or some of the information discussed herein can be based on data that is received, generated and/or maintained by one or more components of apparatus 200. In one embodiment, one or more external systems (such as a remote cloud computing and/or data storage system) may also be leveraged to provide at least some of the functionality discussed herein.

An example architecture for a client device 101A-B is depicted in the apparatus 300 of FIG. 3. As depicted in FIG. 3, the apparatus 300 includes processor 301, memory 303, input/output circuitry 305, and communications circuitry 307. Although these components 301-307 are described with respect to functional limitations, it should be understood that the particular implementations necessarily include the use of particular hardware. It should also be understood that certain of these components 301-307 may include similar or common hardware. For example, two sets of circuitries may both leverage use of the same processor, network interface, storage medium, or the like to perform their associated functions, such that duplicate hardware is not required for each set of circuitries.

In one embodiment, the processor 301 (and/or co-processor or any other processing circuitry assisting or otherwise associated with the processor) may be in communication with the memory 303 via a bus for passing information among components of the apparatus. The memory 303 is non-transitory and may include, for example, one or more volatile and/or non-volatile memories. In other words, for example, the memory 303 may be an electronic storage device (e.g., a computer-readable storage medium). The memory 303 may be configured to store information, data, content, applications, instructions, or the like for enabling the apparatus 300 to carry out various functions in accordance with example embodiments of the present invention. For example, the memory 303 may be configured to cache messages exchanged on one or more group-based communication channels, such that the processor 301 may provide various messages to client devices (e.g., on an as needed or as requested basis).

The processor 301 may be embodied in a number of different ways and may, for example, include one or more processing devices configured to perform independently. In some preferred and non-limiting embodiments, the processor 301 may include one or more processors configured in tandem via a bus to enable independent execution of instructions, pipelining, and/or multithreading.

In some preferred and non-limiting embodiments, the processor 301 may be configured to execute instructions stored in the memory 303 or otherwise accessible to the processor 301. In some preferred and non-limiting embodiments, the processor 301 may be configured to execute hard-coded functionalities. As such, whether configured by hardware or software methods, or by a combination thereof, the processor 301 may represent an entity (e.g., physically embodied in circuitry) capable of performing operations according to an embodiment of the present invention while configured accordingly. Alternatively, as another example, when the processor 301 is embodied as an executor of software instructions, the instructions may specifically configure the processor 301 to perform the algorithms and/or operations described herein when the instructions are executed.

In one embodiment, the apparatus 300 may include input/output circuitry 305 that may, in turn, be in communication with processor 301 to provide output to the user and, In one embodiment, to receive an indication of a user input. The input/output circuitry 305 may comprise a user interface and may include a display, and may comprise a web user interface, a mobile application, a client device, a kiosk, or the like. In one embodiment, the input/output circuitry 305 may also include a keyboard, a mouse, a joystick, a touch screen, touch areas, soft keys, a microphone, a speaker, or other input/output mechanisms.

The communications circuitry 307 may be any means such as a device or circuitry embodied in either hardware or a combination of hardware and software that is configured to receive and/or transmit data from/to a network and/or any other device, circuitry, or module in communication with the apparatus 300. In this regard, the communications circuitry 307 may include, for example, a network interface for enabling communications with a wired or wireless communication network. For example, the communications circuitry 307 may include one or more network interface cards, antennae, buses, switches, routers, modems, and supporting hardware and/or software, or any other device suitable for enabling communications via a network. Additionally or alternatively, the communications circuitry 307 may include the circuitry for interacting with the antenna/antennae to cause transmission of signals via the antenna/antennae or to handle receipt of signals received via the antenna/antennae.

It is also noted that all or some of the information discussed herein can be based on data that is received, generated and/or maintained by one or more components of apparatus 300. In one embodiment, one or more external systems (such as a remote cloud computing and/or data storage system) may also be leveraged to provide at least some of the functionality discussed herein.

The term "circuitry" should be understood broadly to include hardware and, in one embodiment, software for configuring the hardware. With respect to components of each apparatus 200, 300, the term "circuitry" as used herein should therefore be understood to include particular hardware configured to perform the functions associated with the particular circuitry as described herein. For example, in one embodiment, "circuitry" may include processing circuitry, storage media, network interfaces, input/output devices, and the like. In one embodiment, other elements of the apparatus 200 may provide or supplement the functionality of particular circuitry. For example, the processor 202 may provide processing functionality, the memory 204 may provide storage functionality, the communications circuitry 208 may provide network interface functionality, and the like. Similarly, other elements of the apparatus 300 may provide or supplement the functionality of particular circuitry. For example, the processor 301 may provide processing functionality, the memory 303 may provide storage functionality, the communications circuitry 307 may provide network interface functionality, and the like.

As will be appreciated, any such computer program instructions and/or other type of code may be loaded onto a computer, processor or other programmable apparatus's circuitry to produce a machine, such that the computer, processor or other programmable circuitry that execute the code on the machine creates the means for implementing various functions, including those described herein.

As described above and as will be appreciated based on this disclosure, embodiments of the present invention may be configured as methods, mobile devices, backend network devices, and the like. Accordingly, embodiments may comprise various means including entirely of hardware or any combination of software and hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices.

Moreover, although not shown, various embodiments of a group-based communication platform may comprise one or more databases configured for storing and/or indexing messages exchanged within various group-based communication channels.

Example Data Flows of Embodiments of the Present Invention

Various methods described hereinafter provide many technical improvements over computer functionalities. For example, various embodiments of the present invention enhance user experience in group-based communication systems by enabling multi-device user authentication in such systems using authentication command interfaces and/or limited user authentication routines. In addition, various embodiments described herein provide many technical improvements over computer functionalities by providing mechanisms for user authentication that do not rely on communication accounts such as email accounts, thus enhancing security of group-based communication systems. Furthermore, various embodiments described herein provide many technical improvements over computer functionalities by removing the need to rely on availability and/or operability of external communication devices (e.g., smartphones) to transmit user authentication tokens, thus increasing reliability of login functionalities in group-based communication systems. Moreover, various embodiments described herein provide many technical improvements over computer functionalities by enabling individual and/or collective revocation of active authentication conditions using revocation elements and associated mapping data.

Multi-Device User Authentication

FIG. 4 is an example flow diagram illustrating performing multi-device user authentication for group-based communication interfaces of a group-based communication system. The process 400 illustrated in FIG. 4 is described herein with reference to a group-based communication server, such as the group-based communication server 106 of FIG. 1, but can be performed by any system of one or more computers, such as a system that includes the group-based communication server 106 of FIG. 1. Each block of the flowchart, and combinations of blocks in the flowchart, may be implemented by various means such as hardware, firmware, circuitry and/or other devices associated with execution of software including one or more computer program instructions. For example, one or more of the procedures described in FIG. 4 may be embodied by computer program instructions, which may be stored by a non-transitory memory of an apparatus employing an embodiment of the present invention and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

As depicted in FIG. 4, the process starts at block 402 by identifying a first active interface session on a first computing device (e.g., the first computing device 101A of FIG. 1). The first active session (e.g., the only session on the first computing device) may be associated with one or more active authentication conditions, each of which enable access to a respective group-based communication interface of the group-based communication system. For example, the group-based communication server may identify a first active interface session on a first computing device, where the first active interface session is associated with (e.g., includes electronic data that indicate enablement of) one or more active authentication conditions, and each active authentication condition in turn enables access by the computing device to a single group-based communication interface in a group-based communication system. Thus, the one or more active authentication conditions may collectively enable access to all group-based communication interfaces associated with the first active interface session.

Aspects of an exemplary embodiment of a first active interface session are described with reference to the interface selection user interface 500 illustrated in FIG. 5. The user interface 500 illustrates an instance of a presentation by an app executing on a first computing device, where the app is configured to enable access to a group-based communication system by a user of the first computing device. As depicted in FIG. 5, the user interface 500 includes user interface elements 510, 520, and 530, which present electronic data associated with group-based communication interfaces Kerfuffle, Squelch & Kerfuffle, and Kerfuffle Engineering respectively.

The user interface 500 in FIG. 5 depicts, using electronic data presented by user interface elements 510, 520, and 530, that the user is logged into group-based communication interfaces Kerfuffle, Squelch & Kerfuffle, and Kerfuffle Engineering. Thus, the user interface 500 depicts that the first active interface session is associated with at least three active user authentication conditions, i.e., one active user authentication condition enabling access by the user to Kerfuffle; another active user authentication condition enabling access by the user to Squelch & Kerfuffle; and yet another active user authentication condition enabling access by the user to Kerfuffle Engineering.

To enable a particular active authentication condition associated with a group-based communication interface on the first computing device, the user typically needs to cause execution of a user authentication routine on the first computing device. Executing a user authentication routine may include causing the first computing device to perform one or more operations that in turn cause transmission of a group of one or more individual tokens associated with the particular active authentication condition to the group-based communication server.

For example, user interface element 520 in the user interface 500 of FIG. 5 indicates that, to enable an active authentication condition associated with the group-based communication interface Squelch & Kerfuffle, the user can cause the first computing device to execute an authentication routine that may include: (i) successfully logging into an authentication service provider account using input (e.g., username and password, secondary authentication code, etc.) provided by the user via the first computing device; and (ii) causing a computer system (e.g., an authentication service provider server) to transmit an indication of the successful login to the group-based communication server.

It is to be understood that, to enable n active user authentication conditions on the first computing device, the user typically needs to cause the first computing device to perform n corresponding user authentication routines. Each such user authentication routine may in turn require that user provides, in one or more temporally sequential steps, multiple types of input (such as multiple types of inputs each corresponding to an individual authentication token). It is further to be understood that, in order to enable the n active authentication conditions on a second computing device without multi-device user authentication, the user typically needs to cause the second computing device to perform the n corresponding user authentication conditions. For example, the user may need to repeat supplying multiple types of input using the second computing device, an often tedious and time-consuming task.

In general, if a first active interface session of a group-based communication system on a first computing device includes n logged-in group-based communication interfaces (i.e., is associated with n active authentication conditions), replicating the active authentication conditions of the first active interface session on d devices may require performance of n*d authentication routines. If performing each authentication routine requires an average of m user actions, then a user may need to perform around d*n*m actions to replicate the active authentication conditions of the first active interface session on m devices.

Thus, it is to be understood that, because of the potential multiplicity of required authentication routines required to successfully replicate an active authentication interface in group-based communication systems, group-based communication systems present unique problems for user experience if they do not support multi-device user authentication with limited user authentication routines. It is further to be understood that various embodiments of the present invention address those unique problems by enabling multi-device user authentication in group-based communication systems through using authentication command interfaces and/or limited user authentication routines.

Returning to FIG. 4, at block 404, the group-based communication server causes the first computing device to present an authentication command interface for the first active interface session. The authentication command interface for the first active session may be associated with an expiration time and an aggregate authentication token. The aggregate authentication token may be generated (e.g., by the group-based communication server) using the expiration time. For example, the group-based communication server may generate an authentication command interface (e.g., a QR code) that includes an authentication command (e.g., an HTTP command with a link to an authentication resource) with an aggregate authentication token (e.g., a parameter of the HTTP command that, when processed by the authentication resource, enables access by a command-issuing computing device to one or more associated group-based communication interfaces). Thereafter, the group-based communication server may cause the second computing device to present the generated authentication command interface.

Aspects of the operations corresponding to block 404 are described with reference to FIG. 6, which is a flow diagram illustrating causing a computing device to present an authentication command interface. The process 600 illustrated in FIG. 6 is described herein with reference to a group-based communication server, such as the group-based communication server 106 of FIG. 1, but can be performed by any system of one or more computers, such as a system that includes the group-based communication server 106 of FIG. 1. Each block of the flowchart, and combinations of blocks in the flowchart, may be implemented by various means such as hardware, firmware, circuitry and/or other devices associated with execution of software including one or more computer program instructions. For example, one or more of the procedures described in FIG. 6 may be embodied by computer program instructions, which may be stored by a non-transitory memory of an apparatus employing an embodiment of the present invention and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

The process 600 begins at block 602 with receiving a user request for presentation of the authentication command interface on the first computing device. For example, the group-based communication server may receive a user request for the authentication command interface if the user selects the user interface element 710 (which includes electronic data corresponding to text string "Scan QR code for mobile . . . ") on the user interface 700 of FIG. 7.

At block 604, the group-based communication server generates the aggregate authentication token for one or more active authentication conditions associated with the first active interface session. The aggregate authentication token may be generated based on an expiration time associated with the authentication token.

In some implementations, the group-based communication server generates the aggregate authentication token based on one or more token input values (e.g., by performing a hashing operation using the one or more token input values). Examples of token input values may include an expiration time for the aggregate authentication token (e.g., a time after which the aggregate authentication token no longer can enable the active authentication conditions associated with the first active interface session); a randomly generated value associated with the aggregate authentication token; one or more identifiers (e.g., links) for each group-based communication interface associated with the first active interface session; a time of request for generating an aggregate authentication token (which may or may not be the time of a user request for presenting an authentication command interface); an identifier and/or descriptor of the first computing device and/or the second computing device, etc.

For example, the group-based communication server may generate the aggregate authentication token by hashing an expiration time associated with the aggregate authentication token and a randomly-generated value associated with the aggregate authentication token. As another example, the group-based communication server may generate the aggregate authentication token by hashing the link for each group-based communication interface associated with the first active interface session. In one embodiment, if the result of hashing each link exceeds a size threshold, the group-based communication server may perform one or more operations (e.g., a substring extraction operation) to limit the size of the noted result. In some implementations, if the result of hashing each link exceeds a size threshold, the group-based communication server may hash links of some, but not all, of the group-based communication interfaces. In some implementations, the group-based communication server generates an aggregate authentication server without hashing but hashes the aggregate authentication token prior to transmission of the aggregate authentication token to a recipient computer device (e.g., the second computing device).

In some implementations, the group-based communication server generates the aggregate authentication token based on one or more property values associated with the aggregate authentication token. Some of such property values may be stored (e.g., by the group-based communication server and on a user authentication repository, such as the user authentication repository 108 of FIG. 1) in one or more data structures associated with the aggregate authentication token, such as an instance of the authentication record data structure 800 depicted in FIG. 8.

In an instance of the data structure 800 associated with an aggregate authentication token, field 802 indicates a representation of the aggregate authentication token (e.g., an encrypted representation of the aggregate authentication token); field 804 indicates a randomly-generated value associated with the aggregate authentication token; field 806 indicates a date of creation of the aggregate authentication token and/or the instance of the data structure 800; field 808 indicates a date in which a second computing device attempted to use the aggregate authentication token; field 810 indicates an expiration time or expiration condition associated with the aggregate authentication token; field 812 indicates a time of (scheduled or requested) deletion of an instance of the data structure 800; field 814 indicates an identifier of the second computing device; field 816 indicates a name of the second computing device; and field 818 indicates other parameters of the aggregate authentication token such as identifiers for all group-based communication interfaces associated with the aggregate authentication token. It is to be understood that, to the extent property values denoted by fields 804-818 are determinable at the time of generating an aggregate authentication token, the group-based communication server may use one or more of such property values in generating an aggregate authentication token.

Returning to FIG. 6, at block 606, the group-based communication server generates the authentication command using the aggregate authentication token. The authentication command may include a link to an authentication resource, such as a link to a webpage that invokes an authentication routine associated with a user authentication circuitry of the group-communication server (e.g., the group-based communication server 212 of FIG. 2).

At block 608 of process 600, the group-based communication server generates an authentication command interface based on the authentication command. For example, the authentication command interface may be a visual representation of the authentication command, such as a QR code that, when scanned by a computing device, invokes the authentication command. At block 610, the group-based communication server causes the second computing device to present the authentication command interface. An exemplary embodiment of presenting an authentication command interface is illustrated in the user interface 900 of FIG. 9, which includes a user interface element 920 depicting the authentication command interface (i.e., a QR code) and a user interface element 920 depicting indications of three group-based communication interfaces associated with active authentication conditions.

Returning now to FIG. 4, at block 406, the group-based communication server receives an interface session request from a second computing device. The interface session request may indicate electronic communication by the second computing device with the authentication command interface and receipt by the second computing device of the aggregate authentication token at a first time.

For example, the group-based communication server may receive the interface session request in response to an interaction between the second computing device and the authentication command interface that causes the second computing device to invoke the authentication command associated with the authentication command interface. An example of such an interaction is depicted in FIG. 10, which illustrates a user interface 1000 presented by the second computing device that depicts a real-world image of the user interface element 920 from the user interface 900 of FIG. 1. The user interface element 920 is presented by the first computing device and may be captured by an image sensor of the second computing device. The user interface 900 further depicts a user interface element 1010 that indicates a successful scanning of the user interface element 920 by the second computing device.

The interaction depicted in the user interface 1000 of FIG. 10 may cause the second computing device to transmit data to the group-based communication server that indicate electronic communication by the second computing device with the authentication command interface and receipt by the second computing device of the aggregate authentication token at the first time. Examples of such transmitted data include the aggregate authentication invocation data structure 1100 depicted in FIG. 11. The data structure 1100 includes an aggregate authentication token 1110; a device identifier 1120 associated with the second computing device; and a device name 1130 associated with the second computing device. In one embodiment, the interface session request identifies (e.g., includes) the aggregate authentication token, and the group-based communication server extracts the aggregate authentication token from the interface session request.

At block 408, the group-based communication server determines if a relationship between first time and expiration time satisfies a temporal condition. In one embodiment, determining if the relationship between the first time and the expiration time satisfies the temporal condition includes determining if the first time precedes the expiration time. In response to determining that the first time precedes the expiration time, the group-based communication server determines that the relationship between the first time and the expiration time satisfies the temporal condition. However, in response to determining that the first time does not precede the expiration time, the group-based communication server determines that the relationship between the first time and the expiration time fails to satisfy the temporal condition.

In one embodiment, the group-based communication server may retrieve the expiration time for the aggregate authentication token from a storage resource (e.g., from a user authentication repository, such as the user authentication repository 108 of FIG. 1). For example, the system may retrieve a data structure that includes electronic data related to the aggregate authentication token, such as an instance of the data structure 800 of FIG. 8, and identify an expiration time field in the data structure (e.g., field 810 in an instance of data structure 800).

In one embodiment, the group-based communication server may perform one or more operations on the aggregate authentication token received from the second computing device to extract the expiration time from the aggregate authentication token. For example, if the aggregate authentication token is generated based on the expiration time, the group-based communication server may perform operations to reverse the process of generating the aggregate authentication token and thus determine the expiration time.

In general, it is to be understood that generating aggregate authentication tokens based on particular property values (e.g., the expiration time) associated with such tokens is one way in which aspects of the present invention provide technical improvements over computer functionalities. This is because, when an aggregate authentication token is generated based on a particular property value, a computer system may be able perform operations on the aggregate authentication token to extract the particular property value, thus reducing or eliminating the need for costly database accesses to retrieve the particular property value.

At block 410, in response to determining that the relationship between the first time and the second time satisfies the temporal condition, the group-based communication server causes the second computing device to perform one or more limited user authentication routines. Each limited user authentication routine may be configured to enable a respective active authentication condition on the second computing device.

In one embodiment, the group-based communication server determines which limited user authentication routines to perform by determining any group-based communication interfaces associated with the aggregate authentication token received by the second computing device. For example, the group-based communication server may retrieve (e.g., from a user authentication repository, such as the user authentication repository 108 of FIG. 1) an instance of a data structure that includes electronic data associated with the aggregate authentication data, e.g., an instance of data structure 800 of FIG. 8. The group-based communication server may then determine group-based communication interfaces associated with the aggregate authentication token based on a relevant data field of the instance of the data structure, e.g., data field 808 in an instance of the data structure of FIG. 8.

In one embodiment, the group-based communication server may perform one or more operations on the aggregate authentication token received by the second computing device to extract group-based communication interfaces associated with the aggregate authentication token. As explained above, this may provide technical improvements over computer functionalities by removing the need for costly database retrievals.

In one embodiment, to perform a limited user authentication routine, the group-based communication server may modify an authentication status (e.g., a login tag) of the second computing device in a user authentication repository, such as the user authentication repository 108 of FIG. 1. In one embodiment, to perform a limited user authentication routine, a first component of the group-based communication server (e.g., a group-based communication circuitry of the group-based communication circuitry, such as the group-based communication circuitry 210 of FIG. 2) may generate a group of individual authentication tokens configured to enable access to the group-based communication interface. The first component may then cause the second computing device to automatically (i.e., without a need for user input of the tokens) transmit the group of individual authentication tokens to an authenticating computing resource (e.g., a second component of the group-based communication server, such as a user authentication circuitry of the group-based communication server, e.g., the user authentication circuitry 212 of FIG. 2).

Aspects of the operations corresponding to block 410 are described with reference to FIG. 12, which is a flow diagram illustrating performing a limited user authentication routine. The process 1200 illustrated in FIG. 12 is described herein with reference to a group-based communication server, such as the group-based communication server 106 of FIG. 1, but can be performed by any system of one or more computers, such as a system that includes the group-based communication server 106 of FIG. 1. Each block of the flowchart, and combinations of blocks in the flowchart, may be implemented by various means such as hardware, firmware, circuitry and/or other devices associated with execution of software including one or more computer program instructions. For example, one or more of the procedures described in FIG. 12 may be embodied by computer program instructions, which may be stored by a non-transitory memory of an apparatus employing an embodiment of the present invention and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

Process 1200 begins at step 1202 by generating a group of one or more individual authentication tokens collectively configured to enable access to a group-based user communication interface. The particular group-based user communication interface may be the group-based user communication interface associated with an active authentication condition that the group-based communication server seeks to enable on the second computing device using the limited user authentication routine. In one embodiment, the group of individual authentication tokens include a password token and/or a secondary authentication code token.

At step 1204, the group-based communication server generates a second active interface session on the second computing device using the generated group of one or more active authentication tokens. In one embodiment, the group-based communication server uses the group of one or more active authentication tokens to generate a session identifier for the second active interface session and provides the session identifier to the second computing device. The second computing device may then use the session identifier to cause presentation of data associated with the second active interface session on the second computing device.

In one embodiment, the group-based communication server provides the group of one or more individual authentication tokens to the second computing device, and the second computing device uses the group of one or more individual authentication tokens to cause the group-based communication server to generate a session identifier for the second active interface session and provide the session identifier to the second computing device. For example, the second computing device may automatically transmit the group of one or more individual authentication tokens to the group-based communication server, along with a request for a session identifier for an active interface session on the second computing device with active authentication conditions associated with each authentication token in the group of one or more individual authentication tokens.

A transmission of the group of one or more one or more individual authentication tokens (e.g., from the group-based communication server to the second computing device and/or from the second computing device to the group-based communication server) may use an instance of the individual authentication information data structure 1300 of FIG. 13. The data structure 1300 of FIG. 13 includes sections 1310, 1320, and 1330, each of which include a group of individual authentication tokens for accessing a respective group-based communication interface. As illustrated in the data structure 1300, individual authentication tokens include various types of identifiers, login codes, and secondary authentication codes.

The second active interface session can be associated with the same active authentication conditions as the active authentication conditions associated with the first active interface session. In other words, the active interface session on both the first computing device and the second computing device may enable access to the same retrieved digital content. In one embodiment, to generate a second active interface session that is a replication of a first active interface session associated with one or more active authentication conditions, the group-based communication server combines retrieved digital content for each group-based communication interface associated with a an active authentication condition of the one or more active authentication conditions. In one embodiment, generating the second active interface session may include causing the second computing device to present an updated user interface that includes user interface elements configured to enable access to group-based communication interfaces associated with the second active interface session.

In one embodiment, the group-based communication server generates the session identifier for the second active interface session. In one embodiment, the group-based communication server provides the session identifier for the second active interface session to the second computing device. In one embodiment, the group-based communication server determines (e.g., periodically) if the second computing device is in possession of the session identifier, e.g., by determining if the group-based communication server has received (e.g., in response to a request to the second computing device for transmission of the session identifier and/or in accordance with a protocol for periodically sending the session identifier) an indication of the session identifier from the computing device within a period of time. In response to determining that the second computing device is not in possession of the session identifier, the group-based communication server may terminate the second active interface session by disabling access to the respective group-based communication interface on the second computing device. In one embodiment, the group-based communication platform periodically updates the session identifier and provides the updated session identifier to the second computing device.

For example, the group-based communication server may determine that the second computing device is not in possession of the session identifier if the second computing device fails to provide the session identifier to the group-based communication server in at least one of the following: (i) each request sent to the group-based communication server before expiration and/or deletion of the second active interface session; and (ii) each cookie data item sent to the group-based communication server before expiration and/or deletion of the second active interface session.

The techniques described herein enable a user of a computing device to log into multiple group-based communication interfaces on a first computing device and replicate the logins on any subsequent computing devices by receiving an authentication command interface on those computing devices. By performing multi-device user authentication using authentication command interfaces and/or limited user authentication routines, the techniques described herein enhance user experience in group-based communication systems.

Revoking Authentication Conditions

Various embodiments of the present invention provide techniques for, subsequent to enabling one or more active authentication conditions on a second computing device using multi-device user authentication, revoking the one or more active authentication conditions on the second computing device. For example, various embodiments of the present invention provide techniques for differential revocation of multiple active authentication conditions associated with a first active interface session, whereby a user may revoke some but not all of the multiple active authentication conditions on the second computing device. Enabling differential revocation of multiple active authentication conditions provides various improvements to computer functionality by enhancing user experience and authentication security of group-based communication systems.

Example techniques for differential revocation of active authentication conditions associated with a first active interface session are depicted in FIG. 14, which is a flow diagram illustrating revoking active authentication conditions. The process 1400 illustrated in FIG. 14 is described herein with reference to a group-based communication server, such as the group-based communication server 106 of FIG. 1, but can be performed by any system of one or more computers, such as a system that includes the group-based communication server 106 of FIG. 1. Each block of the flowchart, and combinations of blocks in the flowchart, may be implemented by various means such as hardware, firmware, circuitry and/or other devices associated with execution of software including one or more computer program instructions. For example, one or more of the procedures described in FIG. 14 may be embodied by computer program instructions, which may be stored by a non-transitory memory of an apparatus employing an embodiment of the present invention and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

The process 1400 begins at block 1402 by transmitting (e.g., subsequent to performing one or more user authentication routines to enable one or more active authentication conditions on a second computing device) a communication message to each communication account of one or more communication accounts. A communication account may be associated with a group of one or more active authentication conditions from the active authentication conditions enabled on a second computing device. A communication message to a communication account may identify (e.g., include an indication of a grant of access to) each group-based communication interface associated with an active authentication condition in the corresponding group of one or more active authentication conditions. Moreover, each communication message may include a revocation element (e.g., configured to cause transmission of a request to revoke access to each group-based communication interface in the group of one or more group-based communication interfaces associated with the revocation element).

FIG. 15 is an operational example of a data hierarchy 1500 that depicts, in accordance with various embodiments of the present invention, exemplary relationships between aggregate authentication tokens, active authentication conditions, groups of individual authentication tokens, session identifiers, communication accounts, revocation elements, and communication messages.

As depicted in the data hierarchy 1500 of FIG. 15, an aggregate authentication token 1502 is associated with three authentication conditions: a first active authentication condition 1512, in turn associated with a first group of individual authentication tokens 1522 (e.g., for enabling the first active authentication condition 1512 on a second computing device) and a first session identifier 1532 (e.g., for tracking access to a group-based communication interface associated with the first active authentication condition 1512); a second active authentication condition 1514, in turn associated with a second group of individual authentication tokens 1524 and a second session identifier 1534; and a third active authentication condition 1516, in turn associated with a third group of individual authentication tokens 1526 and a third session identifier 1536.

The data hierarchy 1500 of FIG. 15 depicts that the first active authentication condition 1512 is associated with a communication account A 1542. The data hierarchy 1500 of FIG. 15 further depicts that the second active authentication condition 1514 and the third authentication condition 1516 are both associated with a communication account B 1545. The communication message A 1562 and the communication message B 1565 both include revocation element 1552. The revocation element 1552 is associated with all of the active authentication conditions 1512, 1514, 1516 that are associated with the aggregate authentication condition 1502. In other words, the revocation element 1552 is included in both communication accounts A 1542 and B 1545, and can revoke each active authentication condition 1512, 1514, 1516 associated with the aggregate authentication token 1502.

In one embodiment, transmitting a communication message to a communication account includes: (i) identifying, from data associating each communication account with a group of one or more active authentication conditions, the respective group of one or more active authentication conditions associated with the communication account; (ii) identifying, from data associating each active authentication condition with a group-based communication interface, a group of one or more group-based communication interfaces associated with the communication account and associated with the aggregate authentication condition; (iii) generating the communication message to include an indication of each group-based communication interface in the group of one or more group-based communication interfaces associated with the communication account; and (iv) transmitting the communication message to the communication account. In one embodiment, at least one of the data associating communication accounts with groups of active authentication conditions and the data associating active authentication conditions with group-based communication interfaces are stored on a user authentication repository, such as the user authentication repository 108 of FIG. 1.

Returning to FIG. 14, at block 1404, the group-based communication server maintains mapping data. The mapping data may include one or more of: (i) data associating the revocation element with each group-based communication interface associated with the revocation element; and (ii) data associating the revocation element with one or more session identifiers associated with the revocation element. In one embodiment, the group-based communication server may maintain the mapping data in a user authentication repository, such as the user authentication repository 108 of FIG. 1. In one embodiment, the group-based communication server may maintain mapping data using user authentication circuitry of the group-based communication server, such as the user authentication circuitry 212 of FIG. 2.

At block 1406, the group-based communication server receives a session revocation request indicating an electronic communication with the revocation element. For example, the revocation element may be a link to a revocation resource. In response to a user invocation of the revocation resource (e.g., by a user clicking on the link to the revocation resource), the group-based communication server may receive the session revocation request indicating the electronic communication with the revocation element.

At block 1408, the group-based communication server may identify the group of one or more active authentication conditions associated with the revocation element based on the mapping data and the session revocation request. For example, the group-based communication server may determine an identifier of the revocation element from the session revocation request and query the mapping data based on the identifier to identify the group of one or more active authentication conditions.

At block 1410, the group-based communication server revokes, on the second computing device, each active authentication condition in the group of one or more active authentication conditions associated with the revocation element. For example, the group-based communication server may disable access by the second computing device to each group-based communication interface in the group of one or more group-based communication interfaces.

Enforcing Exclusive Privileges

An active authentication condition may enable the same access privileges to multiple computing devices regardless of whether a computer device enabled the active authentication condition using a limited user authentication routine. In one embodiment, however, at least some active authentication conditions deny certain exclusive privileges to computing devices that enabled the active authentication conditions using limited authorization routines (i.e., "limited authorization" computers).

For example, a limited authorization computing device may not be able to view and/or modify digital content in some or all of the group-based communication channels in the group-based communication interface associated with the active authentication condition. As another example, a limited authorization computing device may not be able to modify individual authentication tokens associated with some active authentication conditions, communication accounts associated with some active authentication conditions, recovery emails or phone numbers associated with some active authentication conditions, etc. As yet another example, unlike a general authorization computing device, a limited authorization computing device authorized using a particular aggregate authentication token to access a particular group-based communication interface associated with a particular communication account (e.g., email account) may not be able to detect other group-based communication interfaces associated with the email account that are not associated with the particular aggregate authentication condition.

Various embodiments of the present invention provide techniques for enforcing exclusive privileges across multiple devices. By limiting privileges of a limited authorization computing device, such techniques improve various computer functionalities by improving authentication security of group-based communication systems. Example techniques for enforcing exclusive privileges across multiple devices are depicted in FIG. 16, which is a flow diagram illustrating enforcing exclusive privileges across multiple devices. The process 1600 illustrated in FIG. 16 is described herein with reference to a group-based communication server, such as the group-based communication server 106 of FIG. 1, but can be performed by any system of one or more computers, such as a system that includes the group-based communication server 106 of FIG. 1. Each block of the flowchart, and combinations of blocks in the flowchart, may be implemented by various means such as hardware, firmware, circuitry and/or other devices associated with execution of software including one or more computer program instructions. For example, one or more of the procedures described in FIG. 16 may be embodied by computer program instructions, which may be stored by a non-transitory memory of an apparatus employing an embodiment of the present invention and executed by a processor in the apparatus. These computer program instructions may direct a computer or other programmable apparatus to function in a particular manner, such that the instructions stored in the computer-readable storage memory produce an article of manufacture, the execution of which implements the function specified in the flowchart block(s).

The process 1600 begins at block 1602 by determining a first group of one or more privileges for enabling access by a first computing device to a first group-based communication interface. At block 1604, the group-based communication server determines a second group of one or more privileges for enabling access by a second computing device to the first group-based communication interface. The group-based communication server may store the first group of privileges and the second group of privileges in a user authentication repository, e.g., the user authentication repository 108 of FIG. 1.

At block 1606, the group-based communication server identifies one or more exclusive privileges, e.g., by comparing the first group of privileges and the second group of privileges to determine privileges that exist in the first group but not in the second group. At step 1608, the group-based communication server enforces the exclusive privileges, e.g., by disabling access to the first group-based communication by the second computing device in accordance with the identified exclusive privileges.

In one embodiment, the exclusive privileges include a privilege to access a selected group-based communication channel of one or more group-based communication channels in the first group-based communication interface. In one embodiment, the exclusive privileges a privilege to add a new communication account to one or more communication accounts associated with the first group-based communication interface.

Additional Implementation Details

Although example processing systems have been described in FIGS. 1-3, implementations of the subject matter and the functional operations described herein can be implemented in other types of digital electronic circuitry, or in computer software, firmware, or hardware, including the structures disclosed in this specification and their structural equivalents, or in combinations of one or more of them.

Embodiments of the subject matter and the operations described herein can be implemented in digital electronic circuitry, or in computer software, firmware, or hardware, including the structures disclosed in this specification and their structural equivalents, or in combinations of one or more of them. Embodiments of the subject matter described herein can be implemented as one or more computer programs, i.e., one or more modules of computer program instructions, encoded on computer-readable storage medium for execution by, or to control the operation of, information/data processing apparatus. Alternatively, or in addition, the program instructions can be encoded on an artificially-generated propagated signal, e.g., a machine-generated electrical, optical, or electromagnetic signal, which is generated to encode information/data for transmission to suitable receiver apparatus for execution by an information/data processing apparatus. A computer-readable storage medium can be, or be included in, a computer-readable storage device, a computer-readable storage substrate, a random or serial access memory array or device, or a combination of one or more of them. Moreover, while a computer-readable storage medium is not a propagated signal, a computer-readable storage medium can be a source or destination of computer program instructions encoded in an artificially-generated propagated signal. The computer-readable storage medium can also be, or be included in, one or more separate physical components or media (e.g., multiple CDs, disks, or other storage devices).

The operations described herein can be implemented as operations performed by an information/data processing apparatus on information/data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (Application Specific Integrated Circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or information/data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described herein can be performed by one or more programmable processors executing one or more computer programs to perform actions by operating on input information/data and generating output. Processors suitable for the execution of a computer program include, by way of example, both general and special purpose microprocessors, and any one or more processors of any kind of digital computer. Generally, a processor will receive instructions and information/data from a read-only memory, a random access memory, or both. The essential elements of a computer are a processor for performing actions in accordance with instructions and one or more memory devices for storing instructions and data. Generally, a computer will also include, or be operatively coupled to receive information/data from or transfer information/data to, or both, one or more mass storage devices for storing data, e.g., magnetic, magneto-optical disks, or optical disks. However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client device having a graphical user interface or a web browser through which a user can interact with an implementation of the subject matter described herein, or any combination of one or more such back-end, middleware, or front-end components. The components of the system can be interconnected by any form or medium of digital information/data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any inventions or of what may be claimed, but rather as description of features specific to particular embodiments of particular inventions. Certain features that are described herein in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results, unless described otherwise. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results, unless described otherwise. In certain implementations, multitasking and parallel processing may be advantageous.

CONCLUSION

Many modifications and other embodiments of the inventions set forth herein will come to mind to one skilled in the art to which these inventions pertain having the benefit of the teachings presented in the foregoing description and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation, unless described otherwise.

That which is claimed:

1. A computer-implemented method for multi-device user authentication for one or more group-based communication interfaces of a group-based communication system, the computer-implemented method comprising:
    identifying, on a first computing device, a first active interface session associated with one or more active authentication conditions, wherein each active authentication condition enables access to a respective group-based communication interface of the group-based communication system;
    causing the first computing device to present an authentication command interface for the first active interface session, wherein: (i) the authentication command interface is associated with an expiration time, (ii) the authentication command interface is associated with an aggregate authentication token; and (iii) the aggregate authentication token is generated using the expiration time;
    receiving an interface session request from a second computing device indicating electronic communication by the second computing device with the authentication command interface and receipt by the second computing device of the aggregate authentication token at a first time;
    determining if a relationship between the first time and the expiration time satisfies a temporal condition; and
    in response to determining that the relationship between the first time and the expiration time satisfies the temporal condition, causing the second computing device to execute one or more limited user authentication routines, wherein each limited user authentication routine is configured to enable a respective active authentication condition on the second computing device.

2. The computer-implemented method of claim 1, wherein the authentication command interface is a visual representation of an authentication command.

3. The computer-implemented method of claim 2, wherein the visual representation is a quick response (QR) code.

4. The computer-implemented method of claim 2, wherein the authentication command includes a link to an authentication resource.

5. The computer-implemented method of claim 1, wherein causing the second computing device to execute a respective limited user authentication routine of the one or more limited user authentication routines comprises:
    generating, for the respective group-based communication interface associated with a respective active authentication condition configured to be enabled by the respective limited user authentication routine, a respective group of one or more individual authentication tokens collectively configured to enable access to the respective group-based communication interface; and
    generating, using the respective group of one or more individual authentication tokens, a second active interface session associated with the respective group-based communication interface, wherein the second active interface session enables access to the respective group-based communication interface.

6. The computer-implemented method of claim 5, wherein the respective group of one or more individual authentication tokens comprises one or more of a password token and a secondary authentication code token.

7. The computer-implemented method of claim 5, further comprising:
    generating a session identifier associated with the second active interface session; and
    transmitting the session identifier to the second computing device.

8. The computer-implemented method of claim 7, further comprising:
    determining if the second computing device is in possession of the session identifier; and
    in response to determining that the second computing device is not in possession of the session identifier, terminating the second active interface session by disabling access to the respective group-based communication interface on the second computing device.

9. The computer-implemented method of claim 1, wherein causing the first computing device to present the authentication command interface for the first active interface session comprises:
    generating the aggregate authentication token;
    generating, using the aggregate authentication token, an authentication command; and
    generating, using the authentication command, the authentication command interface.

10. The computer-implemented method of claim 9, wherein generating the aggregate authentication token comprises:
    identifying one or more token input values, wherein the one or more token input values include the expiration time; and
    generating the aggregate authentication token using the one or more token input values.

11. The computer-implemented method of claim 10, wherein the one or more token input values further include a randomly-generated value.

12. The computer-implemented method of claim 10, wherein the one or more token input values include a respective value denoting a respective identifier associated with each group-based communication interface associated with a respective active authentication condition of the one or more active conditions.

13. The computer-implemented method of claim 10, wherein generating the authentication token using the one or more token input values comprises:

generating a hashed value using the one or more token input values; and generating the authentication token using the hashed value.

14. The computer-implemented method of claim 1, wherein determining if the relationship between the first time and the expiration time satisfies the temporal condition comprises:

determining if the first time precedes the expiration time;

in response to determining that the first time precedes the expiration time, determining that the relationship between the first time and the expiration time satisfies the temporal condition; and in response to determining that the first time does not precede the expiration time, determining that the relationship between the first time and the expiration time fails to satisfy the temporal condition.

15. The computer-implemented method of claim 1, wherein the interface session request identifies the aggregate authentication token and the method further comprises extracting the aggregate authentication token from the interface session request.

16. The computer-implemented method of claim 1, further comprising:

transmitting a respective communication message to each communication account of one or more communication accounts, wherein: (i) each communication account of the one or more communication accounts is associated with a group of one or more active authentication conditions from the one or more active authentication conditions, and (ii) each respective communication message to a respective communication account identifies each group-based communication interface associated with a respective active authentication condition in the respective group of one or more active authentication conditions.

17. The computer-implemented method of claim 16, wherein transmitting a respective communication message to a respective communication account of the one or more communication accounts comprises:

identifying, from data associating each communication account of the one or more communication accounts with a group of one or more active authentication conditions from the one or more active authentication conditions, the respective group of one or more active authentication conditions associated with the respective communication account;

identifying, from data associating each active authentication condition with a respective group-based communication interface, a respective group of one or more group-based communication interfaces associated with the respective communication account and associated with the aggregate authentication token;

generating the respective communication message to include an indication of each respective group-based communication interface in the respective group of one or more group-based communication interfaces; and transmitting the respective communication message to the respective communication account.

18. The computer-implemented method of claim 17, wherein:

the respective communication message further includes a respective revocation element, wherein the revocation element is configured to cause transmission of a request to revoke access to each group-based communication interface in the respective group of one or more group-based communication interfaces.

19. The computer-implemented method of claim 18, further comprising:

maintaining mapping data, wherein the mapping data includes data associating the respective revocation element with each group-based communication interface in the respective group of one or more group-based communication interfaces.

20. The computer-implemented method of claim 19, further comprising:

receiving a session revocation request, the session revocation request indicating an electronic communication with revocation element;

identifying, based on the mapping data and the session revocation request, the respective group of one or more active authentication conditions; and revoking each active authentication condition in the respective group of one or more active authentication conditions on the second computing device by disabling access by the second computing device to each group-based communication interface in the respective group of one or more group-based communication interfaces.

21. The computer-implemented method of claim 20, wherein:

a first active authentication condition of the one or more active authentication conditions is associated with a first group of one or more privileges for enabling access by the first computing device to a first group-based communication interface;

the first active authentication condition is associated with a second group of one or more privileges for enabling access by the second computing device to the first group-based communication interface; and the first group of one or more privileges includes at least one selected privilege not included in the second group of privileges.

22. The computer-implemented method of claim 21, wherein the at least one selected privilege includes one of a privilege to access a selected group-based communication channel of one or more group-based communication channels in the first group-based communication interface or a privilege to add a new communication account to one or more communication accounts associated with the first group-based communication interface.

23. An apparatus comprising at least one processor and at least one non-transitory memory comprising program code, wherein the at least one non-transitory memory and the program code are configured to, with the at least one processor, cause the apparatus to at least perform a method for multi-device user authentication for one or more group-based communication interfaces of a group-based communication system, the method comprising:

identifying, on a first computing device, a first active interface session associated with one or more active authentication conditions, wherein each active authentication condition enables access to a respective group-based communication interface of the group-based communication system;

causing the first computing device to present an authentication command interface for the first active interface session, wherein: (i) the authentication command interface is associated with an expiration time, (ii) the authentication command interface is associated with an aggregate authentication token; and (iii) the aggregate authentication token is generated using the expiration time;

receiving an interface session request from a second computing device indicating electronic communication by the second computing device with the authentication command interface and receipt by the second computing device of the aggregate authentication token at a first time;

determining if a relationship between the first time and the expiration time satisfies a temporal condition; and in response to determining that the relationship between the first time and the expiration time satisfies the temporal condition, causing the second computing device to execute one or more limited user authentication routines, wherein each limited user authentication routine is configured to enable a respective active authentication condition on the second computing device.

24. A non-transitory computer storage medium comprising instructions configured to cause one or more processors to at least perform a method for multi-device user authentication for one or more group-based communication interfaces of a group-based communication system, the method comprising:

identifying, on a first computing device, a first active interface session associated with one or more active authentication conditions, wherein each active authentication condition enables access to a respective group-based communication interface of the group-based communication system;

causing the first computing device to present an authentication command interface for the first active interface session, wherein: (i) the authentication command interface is associated with an expiration time, (ii) the authentication command interface is associated with an aggregate authentication token; and (iii) the aggregate authentication token is generated using the expiration time;

receiving an interface session request from a second computing device indicating electronic communication by the second computing device with the authentication command interface and receipt by the second computing device of the aggregate authentication token at a first time;

determining if a relationship between the first time and the expiration time satisfies a temporal condition; and in response to determining that the relationship between the first time and the expiration time satisfies the temporal condition, causing the second computing device to execute one or more limited user authentication routines, wherein each limited user authentication routine is configured to enable a respective active authentication condition on the second computing device.

* * * * *